(12) United States Patent
Ross et al.

(10) Patent No.: US 10,616,090 B2
(45) Date of Patent: Apr. 7, 2020

(54) LOAD BALANCING IN MULTIPLE-INPUT MULTIPLE-OUTPUT SYSTEMS USING A MESH NETWORK

(71) Applicant: Vivint, Inc., Provo, UT (US)

(72) Inventors: Kevin Ross, Saratoga Springs, UT (US); Muhammad Ahsan Naim, Lehi, UT (US)

(73) Assignee: Vivint, Inc., Provo, UT (US)

( * ) Notice: Subject to any disclaimer, the term of this patent is extended or adjusted under 35 U.S.C. 154(b) by 70 days.

(21) Appl. No.: 15/591,345

(22) Filed: May 10, 2017

(65) Prior Publication Data
US 2018/0331935 A1 Nov. 15, 2018

(51) Int. Cl.
| | | |
|---|---|---|
| H04L 12/26 | (2006.01) |
| H04W 24/08 | (2009.01) |
| H04W 28/08 | (2009.01) |
| H04W 40/02 | (2009.01) |
| H04W 72/04 | (2009.01) |
| H04B 7/06 | (2006.01) |
| H04B 7/0413 | (2017.01) |
| H04W 84/18 | (2009.01) |
| H04W 40/16 | (2009.01) |

(52) U.S. Cl.
CPC ........... *H04L 43/16* (2013.01); *H04B 7/0617* (2013.01); *H04L 43/08* (2013.01); *H04W 24/08* (2013.01); *H04W 28/08* (2013.01); *H04W 72/046* (2013.01); *H04B 7/0413* (2013.01); *H04W 40/16* (2013.01); *H04W 84/18* (2013.01)

(58) Field of Classification Search
CPC ........ H04B 7/14; H04L 5/0055; H04W 24/10; H04W 28/10; H04W 36/0072; H04W 4/70; H04W 76/27; H04W 84/045; H04W 88/04
See application file for complete search history.

(56) References Cited

U.S. PATENT DOCUMENTS 9,072,039 B2   6/2015   Hu et al.
9,277,480 B2   3/2016   Kohli
(Continued)

OTHER PUBLICATIONS

Akyildiz, I. F. et al., "Wireless mesh networks: a survey", Computer Networks (2005), School of Electrical and Computer Engineering, Georgia Institute of Technology, Atlanta, GA, Nov. 1, 2015.
(Continued)

*Primary Examiner* — Awet Haile
(74) *Attorney, Agent, or Firm* — Holland & Hart, LLP

(57) ABSTRACT

Techniques are described for enhancing wireless communication using millimeter wave (mmW) communication and mesh network topology. One method includes transmitting data to a first wireless device via a first mmW communication beam from a base station, determining that a performance level of the first mmW communication beam is below a threshold value based on transmitting the data, and communicating with the first wireless device over a transmission route based on a performance level of a second mmW communication beam. In some examples, the transmission route includes a first segment that includes the second mmW communication beam and a second segment that includes a wireless mesh network.

19 Claims, 15 Drawing Sheets

(56) References Cited

U.S. PATENT DOCUMENTS

| | | | |
|---|---|---|---|
| 2014/0321282 A1* | 10/2014 | Pragada | H04W 28/10 |
| | | | 370/235 |
| 2014/0341038 A1 | 11/2014 | Lim | |
| 2014/0376473 A1 | 12/2014 | Leng et al. | |
| 2015/0223114 A1 | 8/2015 | Tian et al. | |
| 2015/0382334 A1* | 12/2015 | El Ayach | H04W 16/28 |
| | | | 370/336 |
| 2016/0087877 A1 | 3/2016 | Ryu et al. | |
| 2016/0098089 A1 | 4/2016 | Poupyrev | |
| 2016/0286374 A1* | 9/2016 | Baghel | H04W 76/14 |
| 2018/0227282 A1* | 8/2018 | Lee | H04L 63/061 |

OTHER PUBLICATIONS

Rotondo, R. et al., "Mesh Networks Delivering IP-Based Seamless Mobility in Municipal and Ad Hoc Wireless Networks", Motorola, Jun. 1, 2006.

Spadacini, M. et al., "Wireless home automation networks for indoor surveillance: technologies and experiments", EURASIP Journal on Wireless Communications and Networking 2014, 2014:6, Jan. 6, 2014, 17 pp.

PCT International Search Report for International Application No. PCT/US2018/031114, dated Aug. 28, 2018 (3 pp.).

\* cited by examiner

LOAD BALANCING IN MULTIPLE-INPUT MULTIPLE-OUTPUT SYSTEMS USING A MESH NETWORK

BACKGROUND

The following relates generally to wireless communication, and more specifically to distributing a load in multiple-input multiple-output (MIMO) systems using a mesh network.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices.

Some mesh networks provide a number of features. Due to the multi-hop interference limitation of some mesh networks, however, it is challenging in some cases to meet the high data traffic requirements of client terminals. Some systems rely on applying multiple-input and multiple-output (MIMO) practices for improving transmission capacity and reliability in mesh networks, but these practices may not be sufficient in various circumstances.

SUMMARY

The described techniques relate to improved methods, systems, devices, or apparatuses that support mesh network. In some examples of a mesh network, wireless communication between two wireless nodes, e.g., between a base station and a wireless device, may be exchanged using communication beams (i.e., millimeter wave (mmW) communication beams) for transmission and/or reception. These communication beams may be directional and only provide coverage for a particular area corresponding to a dimension (e.g., width and length) of the communication beam. For instance, a first communication beam may be configured to communicate with a first wireless device or a first group of wireless devices. In addition, a second communication beam may be configured to communicate with a second wireless device or a second group of wireless devices. Because the communication beams may in some examples be configured to provide network coverage (e.g., services) for a particular coverage area, the first wireless device may not be able to receive any services associated with the second communication beam. Similarly, the second wireless device may not be able to receive any services associated with the first communication beam.

Wireless devices within a same or different coverage area may also communicate with one another via the mesh network. In some examples, the wireless devices may be configured with two or more antennas. A wireless device may use one or more antennas to communicate with the base station. For example, the wireless device may use a first set of antennas to receive and transmit communication beams from and to the base station, and use a second set of antennas to receive and transmit data to other wireless devices within the same or different coverage area of a mesh network. In some examples, the mesh network may be a mmW mesh network. That is, a wireless device may communicate with another wireless device and/or base station using mmW communication beams. Additionally or alternatively, a wireless device may communicate with another wireless device based on a Wi-Fi mesh network, and communicate with the base station using mmW communication beams.

Some examples of wireless communication systems such as, massive multiple-input-multiple-output (MIMO), may provide an increase in capacity of a cell by having multiple communications beams (e.g., 2×2 MIMO) directed towards each wireless device. Existing wireless devices in 2×2 MIMO systems do not possess the capability to receive or transmit more than two communication beams. For example, wireless devices (e.g., mobile phones) generally include at most two receive and transmit antennas due to size constraints of the wireless device. Because of the limited number of antennas, the wireless device may at most receive two communication beams (i.e., two parallel streams) in parallel from a base station. Therefore, existing wireless communication systems (e.g., MIMO devices) lack the ability to increase peak burstable speed to a wireless device.

Antenna ports of a wireless device may be uncorrelated and separated by a distance. For example, in line-of-sight (LoS) point-to-point (P2P) communication links with higher order of multiple streams of data (e.g., 8, 16, or 32 parallel streams) antenna ports of a transmitter may be uncorrelated and parted by a large distance. As a result, the transmitter antenna size may be prohibitively large. Additionally or alternatively, antenna ports of a receiver directed toward the transmitter may also be uncorrelated and separated by a large distance. Similarly, the receiver antenna size may be large. The techniques described herein support increasing burstable speed for wireless devices, without increasing the transmitter or receiver antenna size of the wireless device.

To increase burstable speed for a target wireless device, a base station may transmit a single communication beam directly to the target wireless device, and transmit multiple secondary communication beams indirectly to the target wireless device. The single communication beam and the multiple secondary communication beams may, in some examples, carry the same data, or different data, or both to the target wireless device. In some examples, neighboring wireless devices (i.e., intermediary nodes) may each receive the data carried via one of the multiple secondary communication beams. The neighboring wireless devices may identify a destination for the data based on information provided in a data frame of the data. For example, a starting data frame may include a destination address associated with the target wireless device. Based on the destination address, the neighboring wireless device may communicate the data to the target wireless device, using the mesh network. By transmitting data to a target wireless device using a direct communication beam and multiple secondary communication beams, the peak burstable speed may be increased to (2×2 MIMO system) multiplied by (1+a number of indirect beams). Transmitting information indirectly, in addition to directly, provides an improved technique to boost peak speeds for wireless devices.

In some examples of the mesh network, a communication beam may be congested with network data traffic. Network data traffic may be associated with subscriber data, service data, control data, and/or other user-related data. A base station may be communicating data to a first wireless device on a first communication beam, and communicate data to a second wireless device on a second communication beam. In this case, the first communication beam may be congested with data, while the second communication beam may be less congested with data compared to the first communication beam. For example, the base station may be providing broadband data to multiple users within a home via the first communication beam. The base station may additionally or alternatively provide less resource extensive data (e.g., non-broadband data) via the second communication beam. In some cases, due to the network data traffic congestion, providing data to an end-user may be delayed. To preserve the quality of the user experience and reduce any delayed transmission of data, it may be advantageous for the base station to reconfigure a communication beam. In other words, it may be beneficial for the base station to offload some of the network data traffic to one or more alternative communication beams.

Prior to offloading the network data traffic, the base station may initially identify a communication beam that is congested. The base station may do so by determining a performance level of a communication beam. Determining the performance level may include evaluating a quality of the link associated with the communication beam, a received signal strength indicator (RSSI), a signal-to-noise ratio (SNR), among others. In some cases, the base station may assign a threshold value for the performance level. For example, if the base station determines that the quality of the link for a communication beam is below the assigned threshold value, the base station may determine to evaluate potential alternative communication beams to offload some of the network data traffic. Additionally, the base station may evaluate one or more additional communication beams to determine a capability of each communication beam to allocate resources to aggregate data from a different communication beam. Alternatively, a base station may offload the network data traffic based on identifying a network failure of a communication beam. The base station may identify a network failure of a communication beam based on transmitting for example a ping signal (e.g., heartbeat signal) to a wireless device in communication with the base station via the communication beam. In some cases, the base station may identify the network failure of the communication beam based on the RSSI, SNR, QoS, etc., similar to evaluating a performance level of the communication beam.

In some examples, in response to identifying an additional communication beam to offload some of the network data traffic from the first communication beam, the base station may communicate with the first wireless device over a transmission route that includes a first segment that includes the additional communication beam and a second segment that includes a wireless mesh network (e.g., mmW wireless mesh network or Wi-Fi mesh network). The transmission route may be predetermined at the base station or it may be configured at each corresponding node in the transmission route. In the example of aggregating data from a first communication beam to a second communication beam, the base station may be aware that a first transmission of the transmission route includes transmitting the aggregated data to wireless device via the second communication beam. At the wireless device, the transmission route may be revaluated. For example, the wireless device may initially identify a receiving wireless device associated with the aggregated data. Based on the identified receiving wireless device, the wireless device may analyze a number of hops from the wireless device to the receiving wireless device. In one aspect, the number of hops may be identified based on an analysis of a network topology. The wireless device may determine a second transmission for the transmission route based on the number of hops. The wireless device may be in a same mesh network as the receiving device. The second transmission may also include a mmW communication beam transmission or a Wi-Fi transmission scheme. The receiving device may receive the aggregated data based on the second transmission. As a result, the techniques described herein also provide load balancing for wireless communication systems that include a mesh network.

A method of wireless communication is described. The method may include transmitting data to a first wireless device via a first mmW communication beam from a base station, determining that a performance level of the first mmW communication beam is below a threshold value based at least in part on transmitting the data, and determining that a performance level of the first mmW communication beam is below a threshold value based at least in part on transmitting the data.

An apparatus for wireless communication is described. The apparatus may include means for transmitting data to a first wireless device via a first mmW communication beam from a base station, means for determining that a performance level of the first mmW communication beam is below a threshold value based at least in part on transmitting the data, and means for determining that a performance level of the first mmW communication beam is below a threshold value based at least in part on transmitting the data.

Another apparatus for wireless communication is described. The apparatus may include a processor, memory in electronic communication with the processor, and instructions stored in the memory. The instructions may be operable to cause the processor to transmit data to a first wireless device via a first mmW communication beam from a base station, determine that a performance level of the first mmW communication beam is below a threshold value based at least in part on transmitting the data, and determine that a performance level of the first mmW communication beam is below a threshold value based at least in part on transmitting the data.

A non-transitory computer readable medium for wireless communication is described. The non-transitory computer-readable medium may include instructions operable to cause a processor to transmit data to a first wireless device via a first mmW communication beam from a base station, determine that a performance level of the first mmW communication beam is below a threshold value based at least in part on transmitting the data, and determine that a performance level of the first mmW communication beam is below a threshold value based at least in part on transmitting the data.

Some examples of the method and apparatus described above may further include processes, features, means, or instructions for determining that the performance level of the second mmW communication beam from the base station may be above the threshold value based at least in part on determining that the performance level of the first mmW communication beam may be below the threshold value. In some examples of the method and apparatus described above, the second mmW communication beam from the base station may be associated with a second wireless device. In some examples of the method and apparatus described above, the mesh network comprises the first wireless device at a first structure and the second wireless device at a second structure that may be different from the first structure. In some examples of the method and apparatus described above, the base station may be a serving base station for the first wireless device and the second wireless device.

In some examples of the method and apparatus described above, the data may be associated with a home automation and security service. In some examples of the method and apparatus described above, the performance level of the first mmW communication beam may be based on data traffic, a quality of service (QoS), a quality of a communication link between the base station and the first wireless device, a received signal strength indicator (RSSI), a signal to noise ratio (SNR), or a combination thereof. In some examples of the method and apparatus described above, the performance level of the second mmW communication beam may be based on a data traffic, a quality of service (QoS), a quality of a communication link between the base station and the second wireless device, a received signal strength indicator (RSSI), a signal to noise ratio (SNR), or a combination thereof.

Some examples of the method and apparatus described above for determining that the performance level of the first mmW communication beam is below the threshold value may further include processes, features, means, or instructions for identifying one or more neighboring wireless devices each located at a different location, at least one of the one or more neighboring wireless devices comprising a second wireless device. Some examples of the method and apparatus described above may further include processes, features, means, or instructions for comparing a performance level of a mmW communication beam associated with each of the one or more neighboring wireless devices. Some examples of the method and apparatus described above may further include processes, features, means, or instructions for determining that the performance level of the second mmW communication beam may be above the threshold value based at least in part on the comparing.

Some examples of the method and apparatus described above for comparing the performance level of the mmW communication beam associated with each of the one or more neighboring wireless devices may further include processes, features, means, or instructions for comparing a network load capacity of the mmW communication beam associated with each of the one or more neighboring wireless devices based at least in part on network resources of the base station and a resource utilization of at least one service associated with each of the one or more neighboring wireless devices.

Some examples of the method and apparatus described above may further include processes, features, means, or instructions for receiving a resource utilization indication identifying available resources for load balancing from at least one of the one or more neighboring wireless devices. Some examples of the method and apparatus described above may further include processes, features, means, or instructions for redirecting communication over the first mmW communication beam to at least one mmW communication beam associated with at least one neighboring wireless device based at least in part on the resource utilization indication.

Some examples of the method and apparatus described above may further include processes, features, means, or instructions for selecting the second mmW communication beam to transmit data associated with the first wireless device based at least in part on comparing the performance level of the mmW communication beam associated with each of the one or more neighboring wireless devices. Some examples of the method and apparatus described above may further include processes, features, means, or instructions for determining, in response to the selecting, a route for transmission of the data to the first wireless device via the at least one mmW communication beam and the wireless mesh network. Some examples of the method and apparatus described above may further include processes, features, means, or instructions for transmitting the data to the first wireless device based at least in part on the determined route. In some examples of the method and apparatus described above, an indication of the route may be transmitted in a header of a data packet associated with the data.

Some examples of the method and apparatus described above may further include processes, features, means, or instructions for comparing a number of hops between the at least one neighboring wireless device and the first wireless device. Some examples of the method and apparatus described above may further include processes, features, means, or instructions for selecting a transmission path from the at least one neighboring wireless device to the first wireless device based at least in part on the comparing the number of hops, a topology of the wireless mesh network, and the resource utilization of each of the neighboring wireless devices in the mesh network. Some examples of the method and apparatus described above may further include processes, features, means, or instructions for where communicating with the first device may be based at least in part on the selected transmission path.

Some examples of the method and apparatus described above may further include processes, features, means, or instructions for transmitting a capability indication of the second mmW communication beam to the first wireless device via the selected transmission path. Some examples of the method and apparatus described above may further include processes, features, means, or instructions for transmitting route information to the first wireless device via the selected transmission path, the route information indicating a path through the mesh network to the at least one neighboring wireless device associated with the second mmW communication beam.

A method of for wireless communication is described. The method may include receiving data at a first wireless device via a first millimeter wave (mmW) communication beam of a base station, identifying that a performance level of the first mmW communication beam is below a threshold value based at least in part on the data, and communicating data to the base station over a transmission route based at least in part on a performance level of a second mmW communication beam, wherein the transmission route comprises a first segment that includes a wireless mesh network and a second segment that includes a second mmW communication beam.

An apparatus for wireless communication is described. The apparatus may include means for receiving data at a first wireless device via a first millimeter wave (mmW) communication beam of a base station, means for identifying that a performance level of the first mmW communication beam is below a threshold value based at least in part on the data, and means for communicating data to the base station over a transmission route based at least in part on a performance level of a second mmW communication beam, wherein the transmission route comprises a first segment that includes a wireless mesh network and a second segment that includes a second mmW communication beam.

Another apparatus for wireless communication is described. The apparatus may include a processor, memory in electronic communication with the processor, and instructions stored in the memory. The instructions may be operable to cause the processor to receive data at a first wireless device via a first millimeter wave (mmW) communication beam of a base station, identify that a performance level of the first mmW communication beam is below a threshold value based at least in part on the data, and communicate data to the base station over a transmission route based at least in part on a performance level of a second mmW communication beam, wherein the transmission route comprises a first segment that includes a wireless mesh network and a second segment that includes a second mmW communication beam.

A non-transitory computer readable medium for wireless communication is described. The non-transitory computer-readable medium may include instructions operable to cause a processor to receive data at a first wireless device via a first millimeter wave (mmW) communication beam of a base station, identify that a performance level of the first mmW communication beam is below a threshold value based at least in part on the data, and communicate data to the base station over a transmission route based at least in part on a performance level of a second mmW communication beam, wherein the transmission route comprises a first segment that includes a wireless mesh network and a second segment that includes a second mmW communication beam.

Some examples of the method, apparatus, and non-transitory computer-readable medium described above may further include processes, features, means, or instructions for identifying that the performance level of the second mmW communication beam from the base station may be above the threshold value based at least in part on identifying that the performance level of the first mmW communication beam may be below the threshold value.

Some examples of the method, apparatus, and non-transitory computer-readable medium described above may further include processes, features, means, or instructions for receiving, from the base station, route information indicating a path to a second wireless device associated with the second mmW communication beam. Some examples of the method, apparatus, and non-transitory computer-readable medium described above may further include processes, features, means, or instructions for where transmitting data to the base station may be based at least in part on the route information.

Some examples of the method, apparatus, and non-transitory computer-readable medium described above may further include processes, features, means, or instructions for receiving an indication that the second wireless device may be associated with the second mmW communication beam. Some examples of the method, apparatus, and non-transitory computer-readable medium described above may further include processes, features, means, or instructions for determining a number of hops from the second wireless device to the first wireless device based at least in part on a topology of the wireless mesh network. Some examples of the method, apparatus, and non-transitory computer-readable medium described above may further include processes, features, means, or instructions for selecting a route through the mesh network from the first wireless device to the second wireless device based at least in part on determining the number of hops. Some examples of the method, apparatus, and non-transitory computer-readable medium described above may further include processes, features, means, or instructions for where transmitting data to the base station may be based at least in part on the selecting the route.

DETAILED DESCRIPTION

Figure 1:
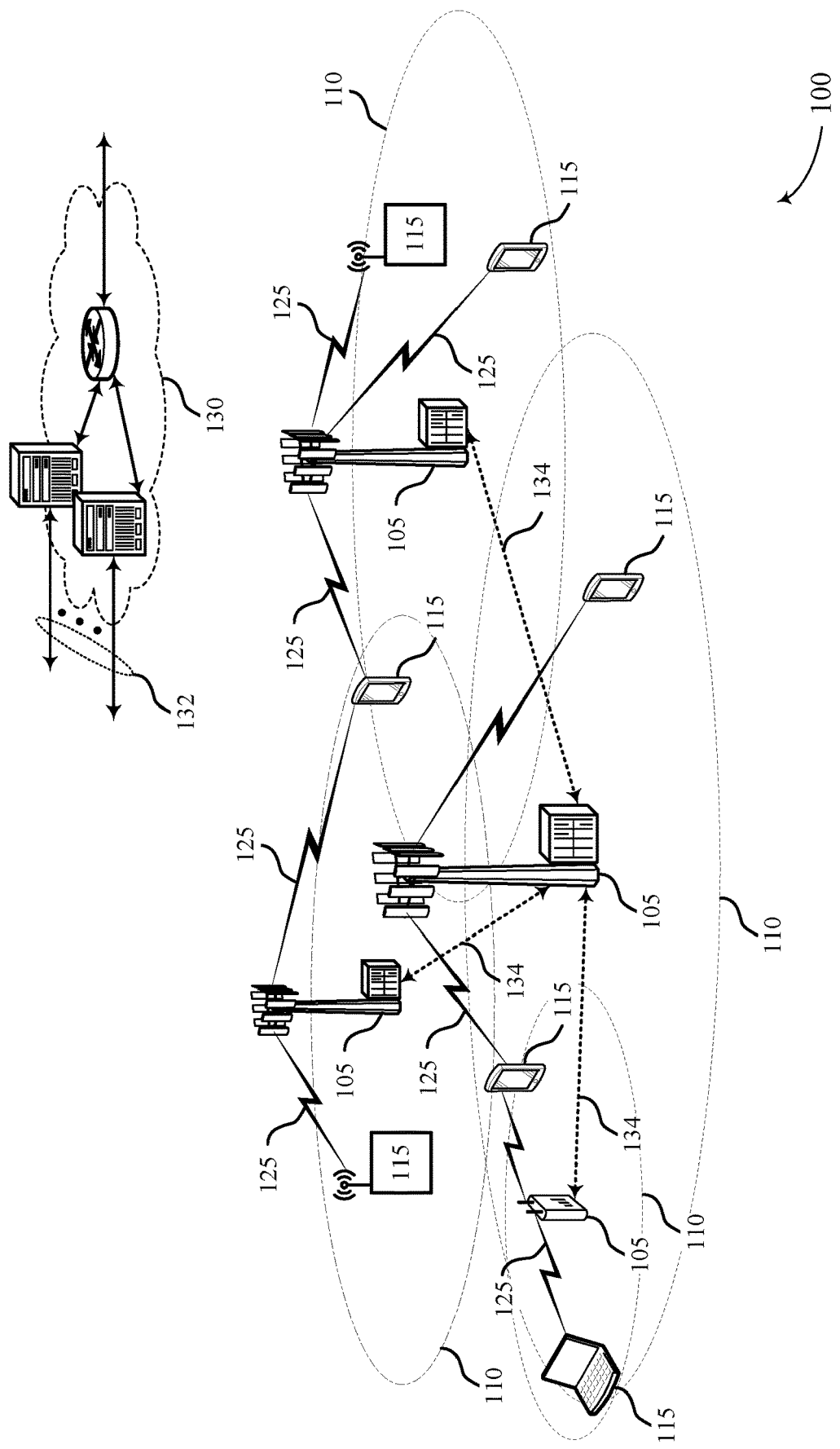
FIG. 1 illustrates an example of a system for wireless communication that supports load balancing in a MIMO system using a mesh network in accordance with aspects of the present disclosure.

In some cases, techniques described herein may relate to load balancing in multiple-input multiple-output (MIMO) systems using a mesh network. In some cases, the mesh network may be a mmW mesh network. The mesh network may in some cases be wireless or wired. In some examples, a plurality of wireless devices may be positioned in an area. For example, each wireless device may be installed at different home or businesses that are within the predetermined area (e.g., community, neighborhood). Some examples of MIMO systems may provide an increase in capacity of a cell by having multiple communications beams directed towards a wireless device. In some cases, wireless devices of MIMO systems may be limited by a number of antennas. For example, a wireless device may include 2 receive antennas and 2 transmit antennas. As a result, this wireless device may at most receive two communication beams (e.g., 2 parallel data streams) in parallel from a base station.

To increase transmission rate for a wireless device, a base station may transmit a single communication beam directly to the wireless device, and transmit one or more secondary communication beams in-directly to the wireless device. For example, a base station may transmit a data stream directly to a target wireless device using a first communication beam, and transmit the data stream (e.g., copies of the data stream) in-directly to the target wireless device using one or more secondary communication beams. The secondary communication beams are directed to other wireless devices. In some examples, the communication beams may be separated by a distance (e.g., angle) from one another.

A neighboring wireless devices (i.e., intermediary node) may receive the data stream via a secondary communication beam. The neighboring wireless device may identify a recipient for the data stream based on information provided in a data frame of the data stream. In some examples, the neighboring wireless device may communicate the data stream to the target wireless device, using the mmW or WLAN mesh network. In some cases, in response to the target wireless device receiving the data stream from the base station (via the direct communication beam) and the neighboring wireless device (via the mesh network), the wireless device may assemble and construct the data stream. In the case, that multiple data streams are transmitted to the target wireless device, these multiple data stream may be marked to identify each data stream. By transmitting data to the target wireless device using a direct communication beam and one or more secondary communication beams, the peak burstable speed may be increased to (2×2 MIMO system) multiplied by (1+a number of in-direct beams). Thus, transmitting information indirectly, in addition to directly, provides an improved technique to boost peak speeds for wireless devices.

In some aspects, the techniques described may include aggregating two or more wireless devices in a mesh network based on a load/capacity parameter associated with the two or more wireless devices and/or other wireless devices. In some cases, transmission of data between the plurality of wireless devices may be based on a load/capacity parameter associated with a wireless device. For example, a wireless device may be limited to a maximum and/or minimum handling capacity for processing data traffic from or to one or more wireless devices in a mesh network and/or a serving base station. The shifting of the load/capacity through the mesh network may occur, for example, through the connection to multiple transmitters in the network. MIMO wireless devices may include a plurality of antennas at a transmitter location (e.g., mesh wireless device or base station) and a plurality of antennas at a receiver location (e.g., another mesh wireless device or serving base station). Receivers of a wireless device capture transmitted signals and employ signal processing techniques to decode and demodulate the signals to recover user data.

In some examples of the mesh network, a base station may be communicating data to a first wireless device on a first communication beam, and communicate data to a second wireless device on a second communication beam. In this case, the first communication beam may be congested with data, while the second communication beam may be less congested with data compared to the first communication beam. For example, the base station may be providing broadband data via the first communication beam.

The base station may additionally or alternatively provide less resource extensive data (e.g., non-broadband data) via the second communication beam. In some cases, due to the network data traffic congestion, providing data to an end-user may be delayed. To preserve the quality of the user experience (e.g., data streaming) and reduce any delayed transmission of data, it may be advantageous for the base station to reconfigure a communication beam. For instance, it may be beneficial for the base station to offload some of the network data traffic to one or more alternative communication beams. The base station may initially identify a communication beam that is congested. The base station may do so by determining a performance level of a communication beam, for example, a maximum and/or minimum handling capacity. For example, if the base station determines that the quality of the link for a communication beam is below a threshold value, the base station may determine to evaluate potential alternative communication beams to offload some of the network data traffic.

In some examples, the base station may communicate with the first wireless device over a transmission route that includes a first section that includes the additional communication beam and a second section that includes a wireless mesh network (e.g., mmW wireless mesh network or Wi-Fi mesh network). The transmission route may be predetermined at the base station or it may be configured at each corresponding node in the transmission route. In the example of aggregating data from a first communication beam to a second communication beam, the base station may be aware that a first transmission of the transmission route includes transmitting the aggregated data to wireless device via the second communication beam.

At the wireless device, the transmission route may be revaluated. For example, the wireless device may initially identify a receiving wireless device associated with the aggregated data. Based on the identified receiving wireless device, the wireless device may analyze a number of hops from the wireless device to the receiving wireless device. In one aspect, the number of hops may be identified based on an analysis of a network topology. The wireless device may determine a second transmission for the transmission route based on the number of hops. The wireless device may be in a same mesh network as the receiving device. The second transmission may also include a mmW communication beam transmission or a Wi-Fi transmission scheme. The receiving device may receive the aggregated data based on the second transmission. As a result, the techniques described herein provide load balancing for wireless communication systems that include a mesh network Aspects of the disclosure are initially described in the context of a wireless communications system. Exemplary wireless devices (e.g., user equipment) network wireless devices (e.g., base stations, eNB, gNB), systems, and process flow for load balancing in a MIMO system using a mesh network are then described. Aspects of the disclosure are further illustrated by and described with reference to apparatus diagrams, system diagrams, and flowcharts that relate to mesh network. The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The wireless communications system 100 includes base stations 105, wireless device 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with wireless devices 115 via one or more base station antennas. Each base station 105 may provide communication coverage for a respective geographic coverage area 110. Communication links 125 shown in wireless communications system 100 may include uplink transmissions from a wireless device 115 to a base station 105, or downlink transmissions, from a base station 105 to a wireless device 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more wireless device-specific control regions).

Base station 105 may transmit data to wireless device 115 via a mmW communication beam. In some examples, base station 105 may determine that a performance level of the mmW communication beam is below a threshold value. Base station 105 may compute the performance level of the mmW communication beam based on data traffic, a QoS, a quality of a communication link between the base station 105 and the wireless device 115, a RSSI, a SNR, among others. If base station 105 determines that the performance level is below a threshold value, base station 105 may compare a performance level of a mmW communication beam associated with one or more neighboring wireless devices 115. In one aspect, base station 105 may determine that the performance level of a mmW communication beam of one of the neighboring wireless devices 115 is above the threshold value.

Base station 105 may communicate with wireless device 115 over a transmission route. In one aspect, base station 105 may determine a transmission route to the wireless device 115 based on the mmW communication beam associated with the neighboring wireless device. Based on the transmission route, base station 105 may redirect communication with the wireless device 115 to the mmW communication beam of the neighboring wireless device 115. For example, a transmission route from base station 105 to the wireless device may include a first segment that includes the mmW communication beam of the neighboring wireless device and a second segment that includes communication through a mesh network.

Wireless devices 115 may be dispersed throughout the wireless communications system 100, and each wireless device 115 may be stationary or mobile. A wireless device 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some examples, wireless devices 115 may be one or more radio components (i.e., one or more radio antennas) installed, mounted or configured with a home. For example, wireless devices 115 may be a radio component including one or more antennas installed on a surface of the home for transmitting and receiving data from base station 105 or from a neighboring wireless device.

In some cases, a wireless device 115 may also be able to communicate directly with other wireless device (e.g., using a peer-to-peer (P2P) or device-to-device (D2D) protocol). One or more of a group of wireless devices 115 utilizing D2D communications may be within the geographic coverage area 110 of a cell. Other wireless devices 115 in such a group may be outside the geographic coverage area 110 of a cell, or otherwise unable to receive transmissions from a base station 105. In some cases, groups of wireless devices 115 communicating via D2D communications may utilize a one-to-many (1:M) system in which each wireless device 115 transmits to every other wireless device 115 in the group. In some cases, a base station 105 facilitates the scheduling of resources for D2D communications. In other cases, D2D communications are carried out independent of a base station 105.

Wireless device 115 may be limited by a number of antennas. For example, wireless device 115 may include 2 receive antennas and 2 transmit antennas. Wireless device 115 may at most receive two communication beams (e.g., 2 parallel data streams) in parallel from base station 105. To increase transmission rate for wireless device 115, base station 105 may transmit a single communication beam directly to the wireless device 115, and transmit one or more secondary communication beams in-directly to the wireless device 115. For example, a base station may transmit a data stream directly to a target wireless device using a first communication beam, and transmit the data stream (e.g., copies of the data stream) in-directly to the target wireless device using one or more secondary communication beams. The secondary communication beams are directed to other wireless devices. In some examples, the communication beams may be separated by a distance (e.g., angle) from one another.

Antenna ports of a wireless device 115 may be uncorrelated and separated by a distance. For example, in line-of-sight (LoS) point-to-point (P2P) communication links with higher order of multiple streams of data (e.g., 8, 16, or 32 parallel streams) antenna ports of a transmitter may be uncorrelated and parted by a large distance. The transmitter antenna size may be large. Additionally or alternatively, antenna ports of a receiver directed toward the transmitter may also be uncorrelated and separated by a distance. Similarly, the receiver antenna size may be large. Wireless communication system 100 may support increasing burstable speed for wireless device 115, without increasing the transmitter or receiver antenna size of the wireless device 115.

A neighboring wireless device 115 (i.e., intermediary node) may receive the data stream via a secondary communication beam from base station 105. The neighboring wireless device 115 may identify a recipient for the data stream based on information provided in a data frame of the data stream. In some examples, the neighboring wireless device 115 may communicate the data stream to the wireless device 115, using a mesh network. The mesh network may be a wired or wireless mesh network. For example, the mesh network may be a mmW mesh or Wi-Fi mesh network.

In some cases, in response to the wireless device 115 receiving the data stream from the base station 105 (via the direct communication beam) and the neighboring wireless device 115 (via the mesh network), the wireless device 115 may assemble the data stream. In the case, that multiple data streams are transmitted to the wireless device 115, these multiple data stream may be marked to identify each data stream. By transmitting data from the base station 105 to the wireless device 115 using a direct communication beam and one or more secondary communication beams, the peak burstable speed may be increased to (2×2 MIMO system) multiplied by (1+a number of in-direct beams). Thus, transmitting information indirectly, in addition to directly, provides an improved technique to boost peak speeds for wireless devices 115.

In some examples, a wireless device 115 may be mobile, i.e., not fixed at one location. The wireless device may have an established connection (link) with base station 105. For example, this mobile wireless device 115 may be communicating with base station 105 via an LTE system, NR System, etc. At some time, the wireless device 115 may determine that a performance level of the communication link with the base station 105 is below a threshold value. For instance, wireless device 115 may compute the performance level of the communication link based on data traffic, a QoS, a quality of a communication link between the base station 105 and the wireless device 115, a RSSI, a SNR, among others. In some cases, if wireless device 115 determines that the performance level is below a threshold value, wireless device 115 may scan for neighboring wireless devices 115 to establish a D2D connection via mmW mesh link or a Wi-Fi link, etc. The wireless 115 may receive beacons from neighboring wireless devices 115, and determine that the performance level of a communication link (e.g., mmW communication beam, Wi-Fi link, P2P link) of one of the neighboring wireless devices 115 is above the threshold value. As a result, the wireless device 115 may establish a communication link with the neighboring wireless device 115.

The wireless device 115 may drop a connection and establish a new connection, or maintain a current connection and establish a secondary connection. For example, wireless device 115 may drop the connection with the base station 105, and establish a connection with the neighboring wireless device 115. Alternatively, wireless device 115 may maintain the connection with the base station 105, and in addition establish a connection with the neighboring wireless device 115. In this case, the wireless device may receive data streams via from the base station 105 connection and the neighboring wireless device 115 connection. Alternatively or additionally, wireless device 115 may transmit data indirectly to base station 105 via the neighboring wireless device. For example, the wireless device 115 may transmit a data stream directly to base station 105 via a first direct communication link, in addition the wireless device 115 may transmit a copy of the data stream to base station 105 via an indirect communication link. The indirect communication link may include transmitting the data stream to the neighboring wireless device 115 and from the neighboring wireless device 115 to base station 105. Additionally, in some cases the connection between the base station 105 and wireless device 115 may be of a same or different type (e.g., network connection, frequency, bandwidth) compared to the connection between the wireless device 115 and a neighboring wireless device 115. In some examples, the wireless device 115 may drop the secondary connection, after the performance level of the communication link with the base station 150 satisfies the threshold value.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with wireless devices 115, or may operate under the control of a base station controller (not shown). In some examples, base stations 105 may be macro cells, small cells, hot spots, or the like.

The base stations 105 may wirelessly communicate with the wireless devices 115 via one or more base station antennas. Each of the base stations 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage area 110 for different technologies A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the wireless device 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to wireless devices 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a wireless device 115 (e.g., for directional beamforming). However, EHF transmissions may be subject to even greater atmospheric attenuation and shorter range than UHF transmissions.

Thus, wireless communications system 100 may support millimeter wave (mmW) communications between wireless devices 115 and base stations 105. Devices operating in mmW or EHF bands may have multiple antennas to allow beamforming. That is, a base station 105 may use multiple antennas or antenna arrays to conduct beamforming operations for directional communications with a wireless device 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a wireless device 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a wireless device 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with wireless device 115. Signals may be transmitted multiple times in different directions (e.g., each transmission may be beamformed differently). A mmW receiver (e.g., a wireless device 115) may try multiple beams (e.g., antenna subarrays) while receiving a synchronization signal.

In some cases, the antennas of a base station 105 or wireless device 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a wireless device 115.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A wireless device 115 may be configured with multiple downlink CCs and one or more uplink CCs for carrier aggregation. Carrier aggregation may be used with both FDD and TDD component carriers.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and wireless devices 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, wireless communications system 100 may utilize both a mmW communication (i.e., NR) and mesh network topology. In some cases, wireless devices 115 may communication with one another via a WLAN which may be a type of local-area network in which data is sent and received via high-frequency radio waves rather than cables or wires. Non-line-of-sight may be a type of propagation where the signal energy travels from the transmitter to the receiver via indirect paths with reflections and/or scattering, and no direct line-of-sight (LOS) path is present. LOS may be a type of propagation where most of the signal energy travels directly in a straight line from the transmitter to the receiver, without reflections or scattering.

Wireless communications system 100 may operate in an ultra-high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to wireless devices 115 located indoors.

Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a wireless device 115 (e.g., for directional beamforming). However, EHF transmissions may be subject to even greater atmospheric attenuation and shorter range than UHF transmissions. A communications network with least two pathways to each node, forming a net-like organization. When each node is connected to every other node, the network is said to be fully meshed. When only some of the nodes are linked, switching is required to make all the connections and the network is said to be partially meshed, or partially connected.

Figure 2:
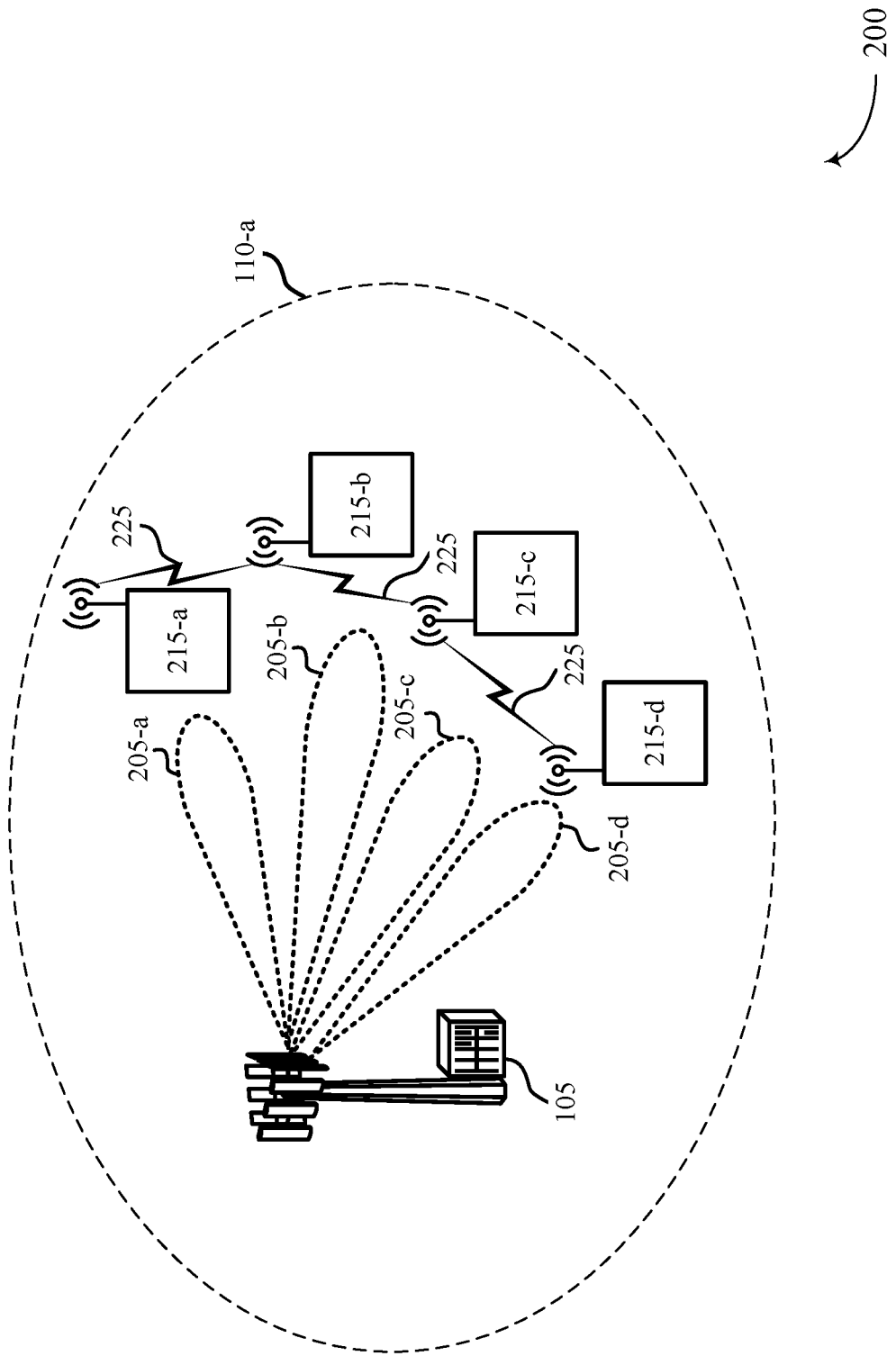
FIG. 2 illustrates an example of a wireless communications system for wireless communication that supports load balancing in a MIMO system using a mesh network in accordance with aspects of the present disclosure.

FIG. 2 illustrates an example of a wireless communications system 200 for wireless communication that supports load balancing in a MIMO system using a mesh network in accordance with aspects of the present disclosure. Wireless communications system 200 may be an example of one or more aspects of wireless communications system 100 of FIG. 1. Some examples of wireless communications system 200 may be a mmW and mesh wireless communication system. Wireless communications system 200 may include wireless device 215-a, wireless device 215-b, wireless device 215-c, wireless device 215-d, and base station 105, which may be one or more aspects of wireless device 115 and base station 105 as described with reference to FIG. 1.

Base stations 105 may be referred to as a base transceiver station, a radio base station, an access point, a radio transceiver, a NodeB, eNodeB (eNB), Home NodeB, a Home eNodeB for wireless communication in a mmW communication system, an LTE communication system, a mesh network communication system, or a combination thereof. In some examples, wireless devices 215 may be one or more radio components (i.e., one or more radio antennas) installed, mounted or configured with or on a structure. For example, wireless devices 215 may be a radio component including one or more antennas installed on a surface of a home for transmitting and receiving data to or from base station 105 or from a neighboring wireless device 215.

Base station 105 may transmit or receive data from wireless devices 215 using one or more mmW communication beams. For example, base station 105 may transmit data to wireless device 215-a using a first mmW communication beam 205-a. Base station 105 may additionally or alternatively transmit data to wireless device 215-b using a second mmW communication beam 205-b. Base station 105 may also or alternatively transmit data to wireless device 215-c using a third mmW communication beam 205-c. In addition, base station 105 may transmit data to wireless device 215-d using a fourth mmW communication beam 205-d. In some cases, the data may be associated with a home automation and security service or system. For example, the home automation and security service may be related to controlling an HVAC system, an electrical system (e.g., turning ON/OFF lights, power, or appliances within a home), arming/disarming a structure, among others. In some cases, each mmW communication beam of base station 105 may transmit different data to each corresponding wireless device 215. Alternatively or additionally, each mmW communication beam of base station 105 may receive different data from each corresponding wireless device 215.

Base station 105 may additionally receive data from wireless device 215-a using the first mmW communication beam 205-a. Base station 105 may additionally or alternatively receive data from wireless device 215-b using the second mmW communication beam 205-b. Base station 105 may also or alternatively receive data from wireless device 215-c using the third mmW communication beam 205-c. In addition, base station 105 may receive data from wireless device 215-d using the fourth mmW communication beam 205-d. In some cases, mmW communication beams 205 of base station 105 may be downlink (DL) mmW communication beams, UL mmW communication beams, or both.

Wireless devices 215 may transmit data to base station 105 using one or more mmW communication beams associated with one or more antennas of the wireless devices 215. In some cases, the wireless devices 215 may include a single antenna. However, in some cases the wireless devices may have more than one antenna, which may be capable of concurrently transmitting or receiving multiple wireless transmissions from base station 105 or from other wireless devices 215, or both. In some cases, wireless devices 215 may have one or more antennas configured to communicate and establish a cellular connection (e.g., LTE).

In some examples, base station 105 may transmit mmW communication beams in a beamformed manner to sweep through an angular coverage region for a geographic coverage area 110-a. For example, each mmW communication beam 205-a through 205-d may be transmitted in a beam sweeping operation in different directions so as to cover the coverage area of base station 105. For example, mmW communication beam 205-a may be transmitted in a first direction, mmW communication beam 205-b may be transmitted in a second direction, mmW communication beam 205-c may be transmitted in a third direction, and mmW communication beam 205-d may be transmitted in a fourth direction. Although wireless communications system 200 illustrates four mmW communication beam, i.e., mmW communication beams 205-a through 205-d, it is to be understood that fewer or more mmW communication beams may be transmitted. Additionally or alternatively, the mmW communication beams may additionally be transmitted at variable beam widths, at different elevation angles, spacing (e.g., 15-degrees) between mmW communication beams, etc.

Base station 105 may in some cases determine that a performance level of one or more mmW communication beams 205 is below a threshold value. For example, base station 105 may determine that a performance level of the first mmW communication beam 205-a is below a threshold value (e.g., operating level) based on transmitting data to wireless device 215-a. Determining the performance level may include evaluating a quality of the link associated with mmW communication beam 205, including based on an RSSI or a SNR, among other quality indicators. In some cases, the base station 105 may assign a threshold value for the performance level. For example, if the base station 105 determines that the quality of the link for mmW communication beam 205 is below the assigned threshold value, the base station 105 may determine to evaluate potential alternative communication beams 205 to offload some of the network data traffic. Additionally, the base station 105 may evaluate one or more additional communication beams 205 to determine a capability of each communication beam 205 to allocate resources to aggregate data from a different communication beam.

Base station 105 may offload network data traffic based on identifying a network failure of a mmW communication beam 205. The base station 105 may identify a network failure of a mmW communication beam 205 based on transmitting for example a beacon to a wireless device 205 in communication with the base station 105. In some cases, the base station 105 may also identify the network failure of the communication beam based on the RSSI, SNR, QoS, etc. or a combination thereof.

In some cases, base station 105 may communicate with wireless device 215-a over a transmission route based on a performance level of one or more of the other mmW communication beams (i.e., mmW communication beam 205-b, mmW communication beam 205-c, or mmW communication beam 205-d), a performance level of one or more devices in a wireless mesh network, or both. For example, base station 105 may determine that the performance level of the second mmW communication beam 205-b from base station 105 is above the threshold value in response to determining that the performance level of the first mmW communication beam 205-a is below the threshold value. As such, base station 105 may continue to transmit data to wireless device 215-a using the transmission route. The transmission route may include a first segment that includes transmitting data on the second mmW communication beam 205-b to wireless device 215-b. Wireless device 215-b may forward the data by transmitting the data to wireless device 215-a via communication link 225. The communication link may be a 60 GHz wireless mesh connection between wireless device 215-a and wireless device 215-b. Alternatively, wireless devices 215-a through 215-d may identify the performance level of the corresponding mmW communication beams 205 of base station 105.

Wireless devices 215 may be configured with two or more antennas configured to establish and communicate via mmW communication, or a cellular connection (e.g., LTE), a mesh network connection, or a combination thereof. In some cases, a subset of the antennas of wireless devices 215 may be configured to communicate via mmW communication beams and a second subset of the antennas maybe configured to communicate via the mesh network connection. For examples, wireless devices 215 may each establish one or more wireless connections with one or more neighboring wireless devices (e.g., node). As illustrated in FIG. 2, communication links 225 may be or include a Wi-Fi or mmW wireless mesh connections between wireless devices 215. In the example provided above, where wireless devices 215 may be one or more radio components (i.e., one or more radio antennas) installed, mounted, or configured with or on a structure. In some cases, wireless device 215-a of a mesh network may be first wireless device (e.g., fixed or mobile) located at a first structure (e.g., home), and wireless device 215-b may a second wireless device (e.g., fixed or mobile) located at a second structure (e.g., a commercial building). Alternatively, wireless devices 215-a through 215-d may be located at a same location.

In some examples, base station 105 may be a serving base station for wireless devices 215-a through wireless devices 215-d. Alternatively, base station 105 may be a serving base station for a subset of the wireless devices 215. For example, base station 105 may be a serving base station for wireless devices 215-a through 215-c, while a different base station (not shown) may be a serving base station for wireless device 215-d. This may occur in cases where a wireless device is within a threshold distance of a network edge of a serving base station. In some examples, this may also be referred to as the wireless device being located in an overlapping coverage area (e.g., of base station 105 and another base station). In this case, the wireless device may communicate with wireless devices in a first coverage area (e.g., geographic coverage area 110-a) via a mesh connection, and communicate with a serving base station in a second coverage area via a mmW communication beam connection.

One or more mmW communication beams 205 of base station 105 may be overloaded, i.e., congested with data traffic. In this case, base station 105 may want to perform load balancing by reallocating some of the data on the congested mmW communication beam to a mmW communication beam that has available resources capability to receive additional load. In some examples, base station 105 may determine a performance level of the first mmW communication beam 205-a is below a threshold value based on analyzing one or more metrics of the first mmW communication beam 205-a.

For example, the one or more metrics may include data traffic, a quality of service (QoS), a quality of a communication link of the first mmW communication beam 205-a, a received signal strength indicator (RSSI), a signal to noise ratio (SNR), or any combination thereof. For example, in one aspect base station 105 may determine that the first mmW communication beam 205-a is overloaded with data based on a real-time data traffic report. Additionally or alternatively, base station 105 may determine the quality of the communication link of the first mmW communication beam based on a number of successfully transmissions to wireless device 215-a. In addition, base station 105 may identify the QoS based on identifying a data (packet) error rate, or throughput latency, or both.

Additionally or alternatively, base station 105 may evaluate a QoS of the transmitted data to wireless device 215-a. As a result, base station 105 may compute a transmission route that may reallocate transmission of the data using the first mmW communication beam 205-a and instead transmit the data using one of the other mmW communication beams 205-b through 205-d. In some examples, base station 105 may determine that the performance level of the second mmW communication beam 205-b is above the threshold value based on analyzing one or more metrics of the second mmW communication beam 205-b. Similarly, the one or more metrics may include data traffic, a quality of service (QoS), a quality of a communication link of the first mmW communication beam 205-a, a received signal strength indicator (RSSI), a signal to noise ratio (SNR), or any combination thereof.

Base station 105 may in some cases compare a network load capacity of the mmW communication beams 205-b through 205-d associated with each of the corresponding wireless devices 215 based on network resources of the base station 105 and a resource utilization of at least one service associated with each of the wireless devices 215. Alternatively, in some cases, base station 105 may receive a resource utilization indication identifying available resources for load balancing from wireless device 215-b, wireless device 215-c, or wireless device 215-d, or any combination thereof. Base station 105 may redirect communication over the first mmW communication beam 205-a to at least one mmW communication beam associated with at least one wireless device 215 based on the resource utilization indication. For example, wireless devices 215-b through 215-d may be running different applications (e.g., broadband streaming, voice call, network searching) and as such the resource utilization may be different for each of the wireless devices 215-b through 215-d. As a result, a wireless device 215 may be more of a candidate for base station 105 to redistribute a load of the first mmW communication beam 205-a (i.e., data for transmission to wireless device 215-a) to a mmW communication beam of the wireless device 215 based on the mmW communication beam having a lower resource utilization value.

In some examples, base station 105 may select a mmW communication beam to transmit data associated with the first mmW communication beam 205-a based on comparing a performance level of the mmW communication beams 205 associated with each of the wireless devices 215. Base station 105 may determine a route for transmission of the data to the wireless device 215-a via the selected mmW communication beam and the mesh connections (i.e., of the wireless mesh network established between wireless devices 215).

In some cases, base station 105 determine the route for transmission of the data to the wireless device 215-a based on transmit and receive rates per mmW communication beam. Alternatively, base station 105 may analyze channel utilization to identify a resource overhead of base station 105 to transmit on a different mmW communication beam.

Additionally, an example route for transmission of the data may include base station 105 transmitting data to wireless device 215-c using the third mmW communication beam 205-c. After transmitting the data to the wireless device 215-c, wireless device 215-c may forward the received data to wireless device 215-b using communication link 225 of the mesh network. In addition, wireless device 215-b may forward the received data to wireless device 215-a using communication link 225 of the mesh network. In some examples, base station 105 may embed the data with a special data packet that may indicate a destination address for the data.

As a result, wireless devices 215-c and 215-b may be aware of the destination address indicated in the special data packet. Alternatively, an indication of the route may be transmitted in a header of a data packet associated with the data. In some cases, base station 105 may segment the data and transmit the segmented data on different mmW communication beams. Base station 105 may embedded a special data packet with the segmented data such that wireless device 215-a may reassemble the data once received.

In some examples, wireless device 215-c may transmit the received data directly to wireless device 215-a via a mesh communication link (not shown). For example, wireless device 215-c may compare a number of hops between a first wireless device (e.g., wireless device 215-c) and a second wireless device (e.g., wireless device 215-a). In the case where the wireless device 215-c transmits the received data directly to wireless device 215-a, the wireless device 215-c may have determined that the wireless device 215-a was one hop away in comparison to transmitting the received data through wireless device 215-b and then to the destination (i.e., wireless device 215-a) which results in two hops.

Additionally or alternatively, base station 105 may be aware of a mesh network topology associated with wireless devices 215. Base station 105 may determine a transmission path based on the mesh network topology. For example, base station 105 may compare a number of hops between a candidate wireless device (e.g., a wireless device 215 with available resource capability due to low resource utilization) and the wireless device 215-*a*. Based on the comparison, base station 105 may select a transmission path from wireless device 215 (i.e., 215-*b*, or 215-*c*, or 215-*d*) to the wireless device 215-*a* based the number of hops, a topology of the wireless mesh network, and the resource utilization of at least some of the wireless devices 215-*b* through 215-*d* in the mesh network.

In some examples, base station 105 may transmit a capability indication of a mmW communication beam to the wireless device 215-*a* via the selected transmission path. For example, the capability indication may indicate to wireless device 215-*a* that a mmW communication beam of one or more of the wireless devices 215-*b* through 215-*d* has available resource capability to transmit and receive data. In some cases, wireless device 215-*a* or any of the other wireless devices 215-*b* through 215-*d* may transmit data to the base station 105 using the mmW communication beam in identified in the capability indication. Base station 105 may transmit route information to the wireless device 215-*a* via the selected transmission path.

In some cases, the route information may indicate a path through the mesh network to at least one wireless device 215 associated with the mmW communication beam used associated with redirecting the data from the mmW communication beam 205-*a* to a different mmW communication beam (e.g., the second mmW communication beam 205-*b*). For example, wireless device 215-*a* may communicate data to the base station 105 over a transmission route based on a performance level of a mmW communication beam of a neighboring wireless device 215. The transmission route may include a first segment that includes one or more connections of devices within a wireless mesh network (e.g., communication link 225 between wireless device 215-*a* and wireless device 215-*b*, or any combination of communication links 225 of wireless communications system 200) and a second segment that includes a mmW communication beam (e.g., second mmW communication beam 205-*b*, third mmW communication beam 205-*c*, or fourth mmW communication beam 205-*d*). Therefore, wireless communications system 200 may support using both mmW communication and mesh network topology for wireless communication.

Figure 3:
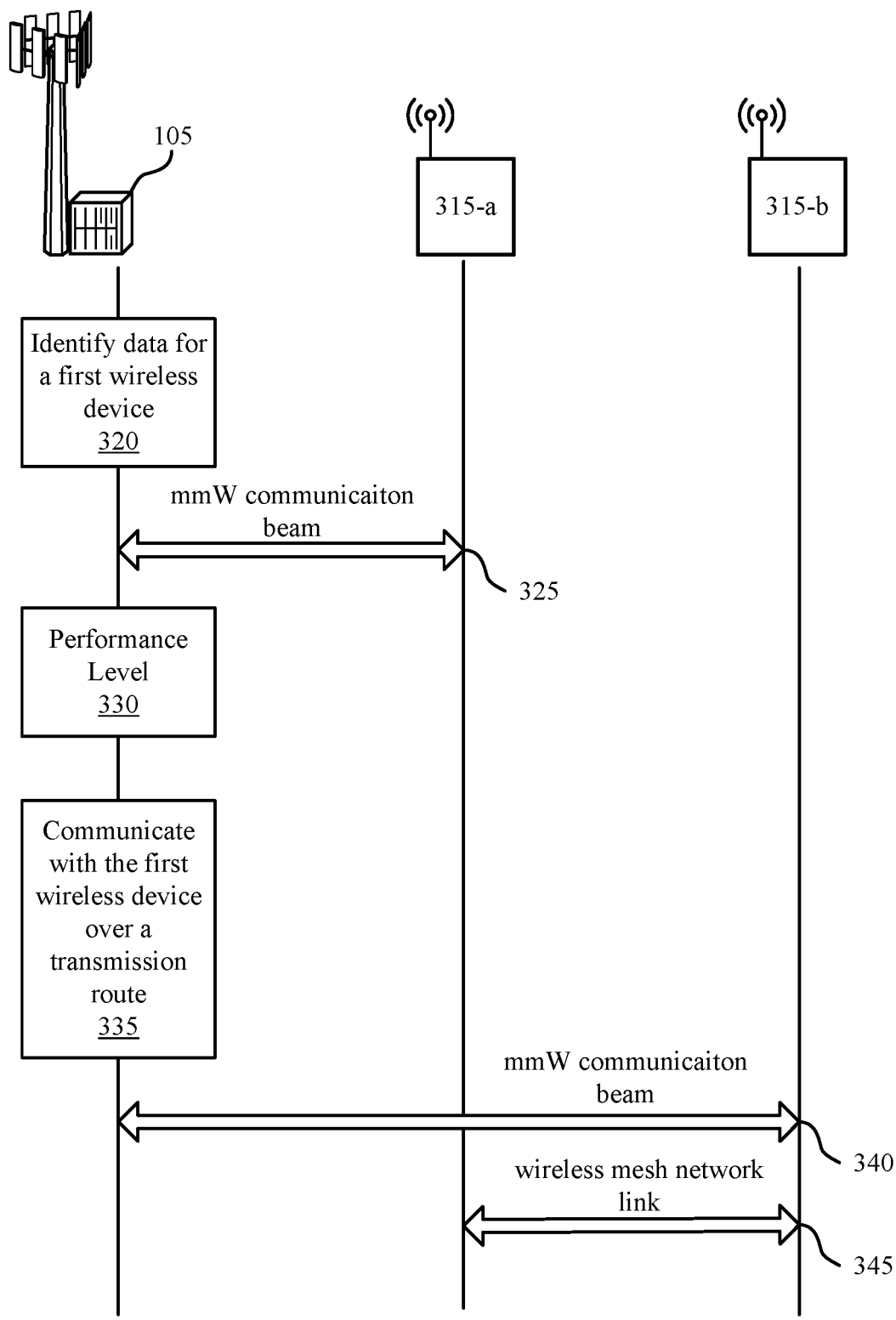
FIG. 3 illustrates an example of a process flow that supports load balancing in a MIMO system using a mesh network in accordance with aspects of the present disclosure.

FIG. 3 illustrates an example of a process flow 300 that supports load balancing in a MIMO system using a mesh network in accordance with aspects of the present disclosure. Process flow 300 may implement aspects of wireless communications system 100 or 200 as described with reference to FIG. 1 or 2. Process flow 300 may include base station 105 and wireless devices 315-*a* and 315-*b*, which may be examples of the corresponding devices of FIGS. 1 and 2. Base stations 105 may be a mmW base station.

At 320, base station 105 may identify data for wireless device 315-*a*. In some cases, the data may be associated with a home automation and security service. For example, the home automation and security service may be related to controlling an HVAC system, an electrical system (e.g., turning ON/OFF lights, power, or appliances within a home), or arming/disarming a structure, among others. Additionally or alternatively, wireless device 315-*a* may request data (e.g., services) from base station 105, and based on the request the base station 105 may identify the requested data for base station 105.

At 325, base station 105 may transmit the identified data to wireless device 315-*a* via a mmW communication beam, as discussed elsewhere herein. At 330, base station 105 may determine that a performance level of the mmW communication beam, used by the base station 105 for transmitting the data, is below a threshold value. In some cases, the performance level of the mmW communication beam may be based on one or more metrics. For example, base station 105 may evaluate network traffic, a QoS, a quality of the link associated with the mmW communication beam, an RSSI value, a SNR, etc.

At 335, base station 105 may communicate with wireless device 315-*a* over a transmission route determined based on the performance level of the mmW communication beam (325). In some cases, the transmission route may include a first segment that includes a second mmW communication beam and a second segment that includes a wireless mesh network. At 340, base station 105 may for example communicate with wireless device 315-*a* by transmitting data to wireless device 315-*b* via the second mmW communication beam. In some examples, the second mmW communication beam may be associated with wireless device 315-*b*, as discussed elsewhere herein. At 345, wireless device 315-*b* may forward the received data from base station 105 by transmitting the data to wireless device 315-*a* via a wireless mesh network link associated with a wireless mesh network.

Figure 4:
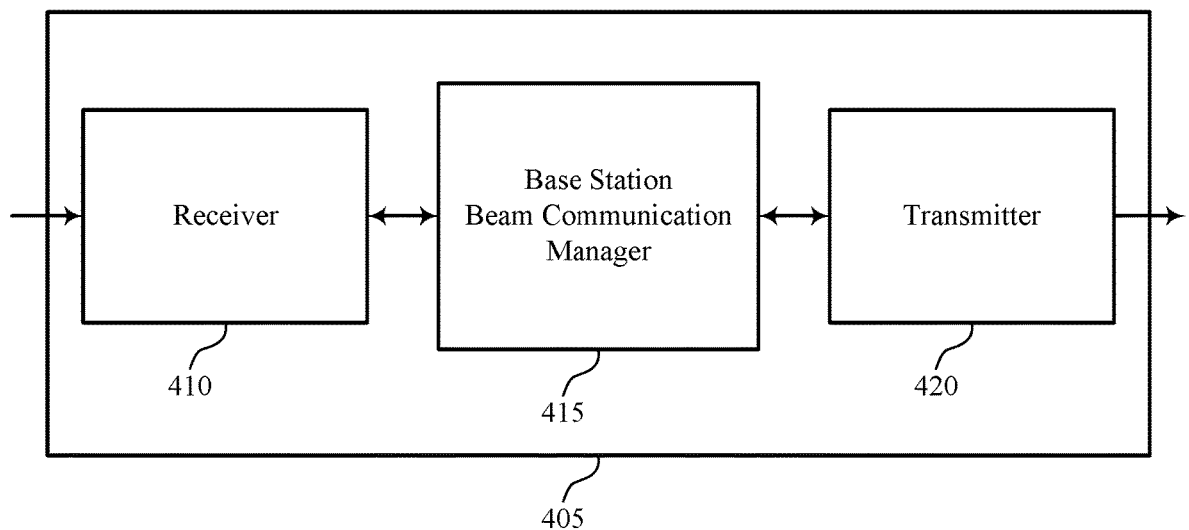
FIGS. 4 through 6 show block diagrams of a device that supports load balancing in a MIMO system using a mesh network in accordance with aspects of the present disclosure.

FIG. 4 shows a block diagram 400 of a wireless device 405 that supports load balancing in a MIMO system using a mesh network in accordance with aspects of the present disclosure. Wireless device 405 may be an example of aspects of a base station 105 as described with reference to FIG. 1. Wireless device 405 may include receiver 410, base station beam communication manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to mesh network, etc.). Information may be passed on to other components of the device. The receiver 410 may be an example of aspects of the transceiver 735 described with reference to FIG. 7. The receiver 410 may utilize a single antenna or a set of antennas. Receiver 410 may receive a resource utilization indication identifying available resources for load balancing from at least one of the one or more neighboring wireless devices.

Base station beam communication manager 415 and/or at least some of its various sub-components may be implemented in hardware, software executed by a processor, firmware, or any combination thereof. If implemented in software executed by a processor, the functions of the base station beam communication manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station beam communication manager 415 and/or at least some of its various sub-components may be physically located at various positions, including being distributed such that portions of functions are implemented at different physical locations by one or more physical devices. In some examples, base station beam communication manager 415 and/or at least some of its various sub-components may be a separate and distinct component in accordance with various aspects of the present disclosure. In other examples, base station beam communication manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station beam communication manager 415 may determine that a performance level of a first mmW communication beam is below a threshold value based on transmitting the data and communicate with the first wireless device over a transmission route based on a performance level of a second mmW communication beam, where the transmission route includes a first segment that includes the second mmW communication beam and a second segment that includes a wireless mesh network.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas. Transmitter 420 may transmit data to a first wireless device via a first millimeter wave (mmW) communication beam from a base station.

Figure 5:
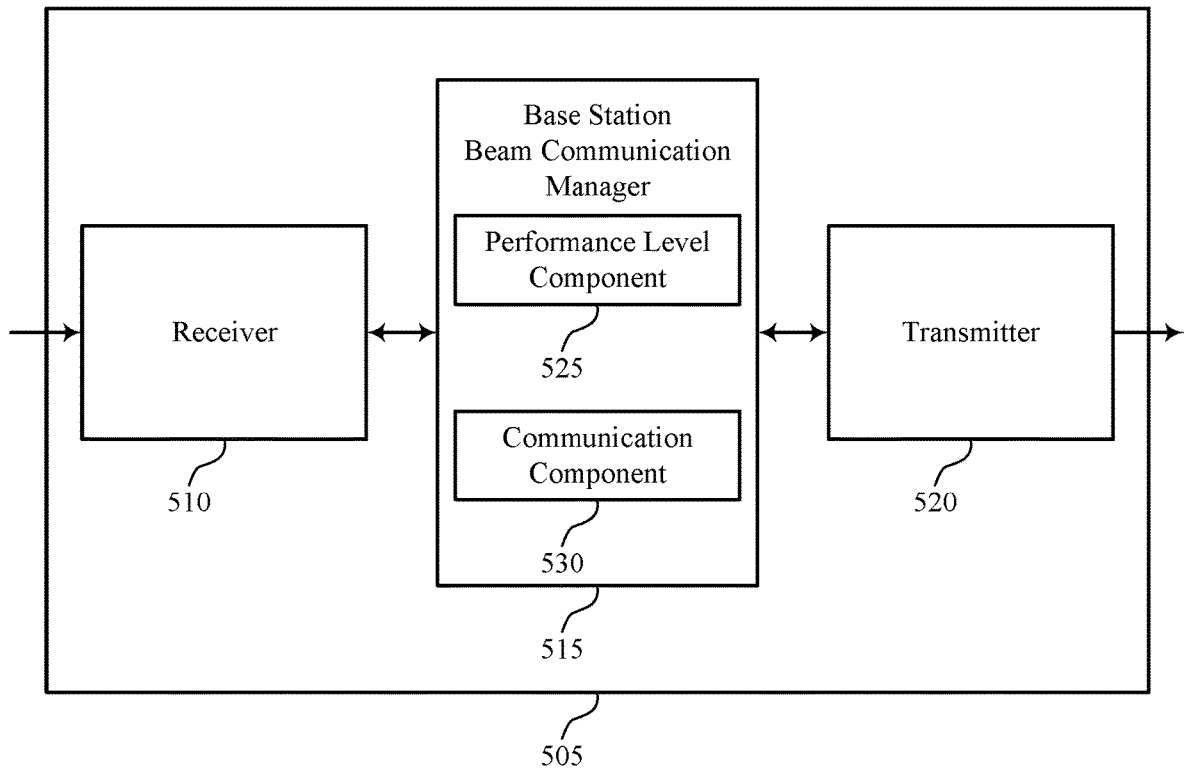

FIG. 5 shows a block diagram 500 of a wireless device 505 that supports load balancing in a MIMO system using a mesh network in accordance with aspects of the present disclosure. Wireless device 505 may be an example of aspects of a wireless device 405 or a base station 105 as described with reference to FIGS. 1 and 4. Wireless device 505 may include receiver 510, base station beam communication manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to mesh network, etc.). Information may be passed on to other components of the device. The receiver 510 may be an example of aspects of the transceiver 735 described with reference to FIG. 7. The receiver 510 may utilize a single antenna or a set of antennas.

Base station beam communication manager 515 may be an example of aspects of the base station beam communication manager 415 described with reference to FIG. 4. Base station beam communication manager 515 may also include performance level component 525 and communication component 530. Performance level component 525 may determine that a performance level of the first mmW communication beam is below a threshold value based on transmitting the data and determine that the performance level of the second mmW communication beam from the base station is above the threshold value based on determining that the performance level of the first mmW communication beam is below the threshold value. In some cases, the second mmW communication beam from the base station is associated with a second wireless device. In some cases, the mesh network includes the first wireless device at a first structure and the second wireless device at a second structure that is different from the first structure. In some cases, the base station is a serving base station for the first wireless device and the second wireless device. In some cases, the data is associated with a home automation and security service.

In some cases, the performance level of the first mmW communication beam is based on data traffic, a quality of service (QoS), a quality of a communication link between the base station and the first wireless device, a received signal strength indicator (RSSI), a signal to noise ratio (signal-to-noise ratio (SNR)), or a combination thereof. In some cases, the performance level of the second mmW communication beam is based on a data traffic, a quality of service (QoS), a quality of a communication link between the base station and the second wireless device, a received signal strength indicator (RSSI), a signal to noise ratio (SNR), or a combination thereof.

Communication component 530 may communicate with the first wireless device over a transmission route based on a performance level of a second mmW communication beam, where the transmission route includes a first segment that includes the second mmW communication beam and a second segment that includes a wireless mesh network, redirect communication over the first mmW communication beam to at least one mmW communication beam associated with at least one neighboring wireless device based on the resource utilization indication, select the second mmW communication beam to transmit data associated with the first wireless device based on comparing the performance level of the mmW communication beam associated with each of the one or more neighboring wireless devices, transmit the data to the first wireless device based on the determined route, where communicating with the first device is based on the selected transmission path, and transmit route information to the first wireless device via the selected transmission path, the route information indicating a path through the mesh network to the at least one neighboring wireless device associated with the second mmW communication beam. In some cases, an indication of the route is transmitted in a header of a data packet associated with the data.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
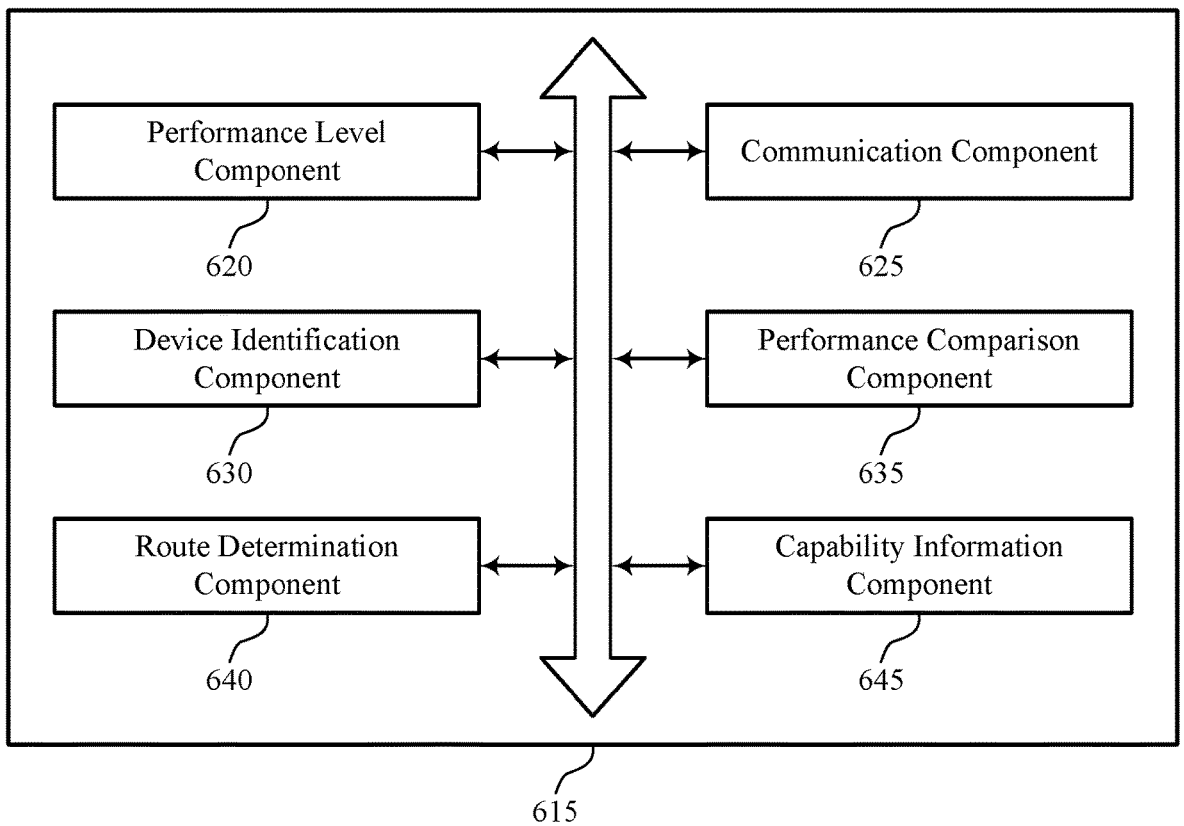

FIG. 6 shows a block diagram 600 of a base station beam communication manager 615 that supports load balancing in a MIMO system using a mesh network in accordance with aspects of the present disclosure. The base station beam communication manager 615 may be an example of aspects of a base station beam communication manager 415 or a base station beam communication manager 515 described with reference to FIGS. 4 and 5. The base station beam communication manager 615 may include performance level component 620, communication component 625, device identification component 630, performance comparison component 635, route determination component 640, and capability information component 645. Each of these modules may communicate, directly or indirectly, with one another (e.g., via one or more buses).

Performance level component 620 may determine that a performance level of the first mmW communication beam is below a threshold value based on transmitting the data and determine that the performance level of the second mmW communication beam from the base station is above the threshold value based on determining that the performance level of the first mmW communication beam is below the threshold value. In some cases, the second mmW communication beam from the base station is associated with a second wireless device. In some cases, the mesh network includes the first wireless device at a first structure and the second wireless device at a second structure that is different from the first structure.

In some cases, the base station is a serving base station for the first wireless device and the second wireless device. In some cases, the data is associated with a home automation and security service. In some cases, the performance level of the first mmW communication beam is based on data traffic, a quality of service (QoS), a quality of a communication link between the base station and the first wireless device, a received signal strength indicator (RSSI), a signal to noise ratio (SNR), or a combination thereof. In some cases, the performance level of the second mmW communication beam is based on a data traffic, a quality of service (QoS), a quality of a communication link between the base station and the second wireless device, a received signal strength indicator (RSSI), a signal to noise ratio (SNR), or a combination thereof.

Communication component 625 may communicate with the first wireless device over a transmission route based on a performance level of a second mmW communication beam, where the transmission route includes a first segment that includes the second mmW communication beam and a second segment that includes a wireless mesh network, redirect communication over the first mmW communication beam to at least one mmW communication beam associated with at least one neighboring wireless device based on the resource utilization indication, select the second mmW communication beam to transmit data associated with the first wireless device based on comparing the performance level of the mmW communication beam associated with each of the one or more neighboring wireless devices, transmit the data to the first wireless device based on the determined route, where communicating with the first device is based on the selected transmission path, and transmit route information to the first wireless device via the selected transmission path, the route information indicating a path through the mesh network to the at least one neighboring wireless device associated with the second mmW communication beam. In some cases, an indication of the route is transmitted in a header of a data packet associated with the data.

Device identification component 630 may identify one or more neighboring wireless devices each located at a different location, at least one of the one or more neighboring wireless devices including a second wireless device. Performance comparison component 635 may compare a performance level of a mmW communication beam associated with each of the one or more neighboring wireless devices, determine that the performance level of the second mmW communication beam is above the threshold value based on the comparing, compare a network load capacity of the mmW communication beam associated with each of the one or more neighboring wireless devices based on network resources of the base station and a resource utilization of at least one service associated with each of the one or more neighboring wireless devices, and compare a number of hops between the at least one neighboring wireless device and the first wireless device.

Route determination component 640 may determine, in response to the selecting, a route for transmission of the data to the first wireless device via the at least one mmW communication beam and the wireless mesh network and select a transmission path from the at least one neighboring wireless device to the first wireless device based on the comparing the number of hops, a topology of the wireless mesh network, and the resource utilization of each of the neighboring wireless devices in the mesh network. Capability information component 645 may transmit a capability indication of the second mmW communication beam to the first wireless device via the selected transmission path.

Figure 7:
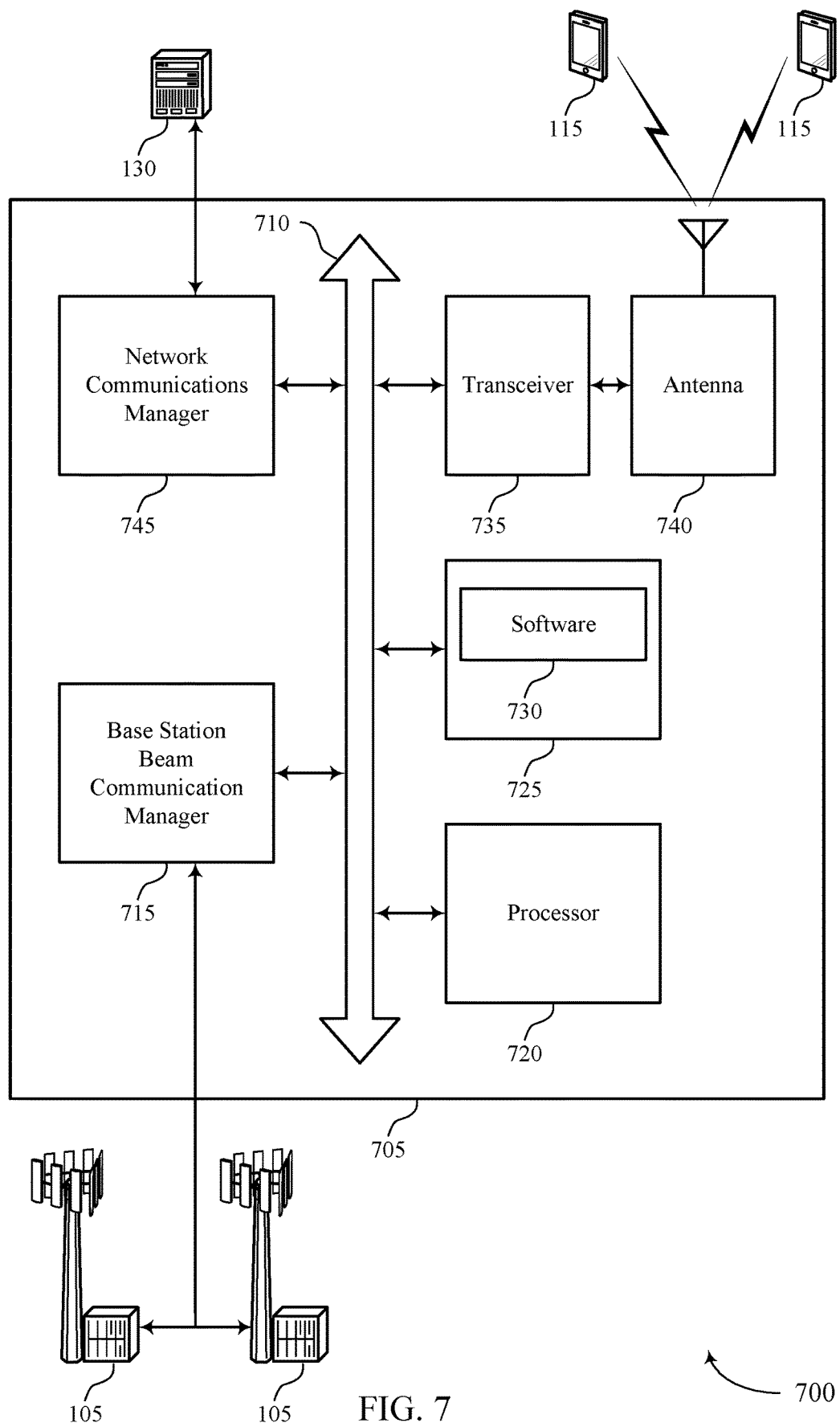
FIG. 7 illustrates a block diagram of a system including a base station that supports load balancing in a MIMO system using a mesh network in accordance with aspects of the present disclosure.

FIG. 7 shows a diagram of a system 700 including a device 705 that supports load balancing in a MIMO system using a mesh network in accordance with aspects of the present disclosure. Device 705 may be an example of or include the components of wireless device 405, wireless device 505, wireless device 605 or a base station 105 as described above, e.g., with reference to FIGS. 1 and 4-6. Device 705 may include components for bi-directional voice and data communications including components for transmitting and receiving communications, including base station beam communication manager 715, processor 720, memory 725, software 730, transceiver 735, antenna 740, network communications manager 745, and inter-station communications manager 750. These components may be in electronic communication via one or more busses (e.g., bus 710). Device 705 may communicate wirelessly with one or more wireless devices 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting mesh network).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware and/or software operation such as the interaction with peripheral components or devices.

Software 730 may include code to implement aspects of the present disclosure, including code to support mesh network. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas. In some cases, the wireless device may include a single antenna 740. However, in some cases the device may have more than one antenna 740, which may be capable of concurrently transmitting or receiving multiple wireless transmissions. Network communications manager 745 may manage communications with the core network (e.g., via one or more wired backhaul links). For example, the network communications manager 745 may manage the transfer of data communications for client devices, such as one or more wireless devices 115.

Base station communications manager 750 may manage communications with other base station 105, and may include a controller or scheduler for controlling communications with wireless devices 115 in cooperation with other base stations 105. For example, the base station communications manager 750 may coordinate scheduling for transmissions to wireless devices 115 for various interference mitigation techniques such as beamforming or joint transmission. In some examples, base station communications manager 750 may provide an X2 interface within an Long Term Evolution (LTE)/LTE-A wireless communication network technology to provide communication between base stations 105.

Figure 8:
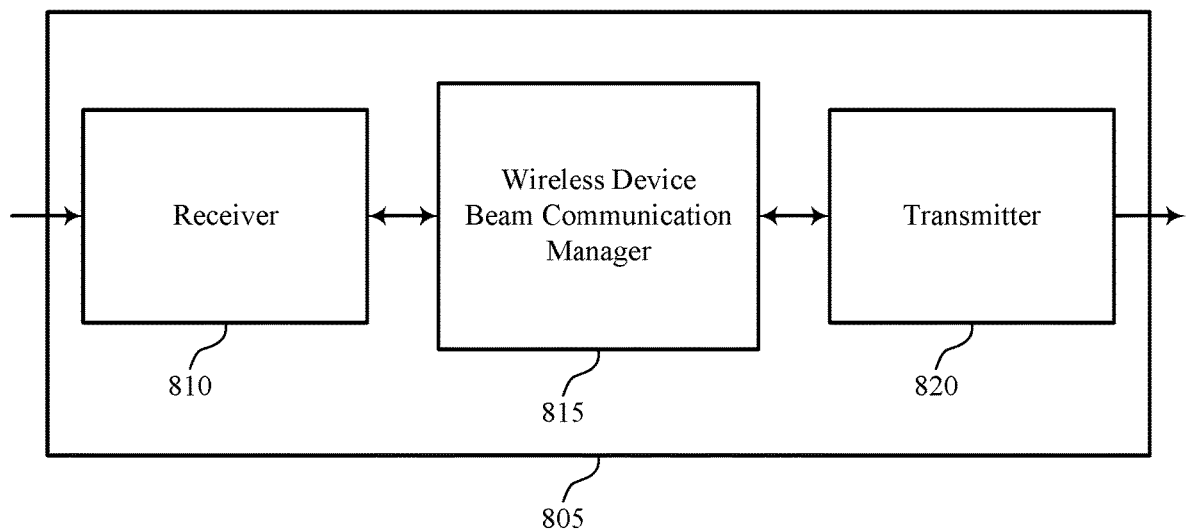
FIGS. 8 through 10 show block diagrams of a device that supports load balancing in a MIMO system using a mesh network in accordance with aspects of the present disclosure.

FIG. 8 shows a block diagram 800 of a wireless device 805 that supports load balancing in a MIMO system using a mesh network in accordance with aspects of the present disclosure. Wireless device 805 may be an example of aspects of a wireless device 115 as described with reference to FIG. 1. Wireless device 805 may include receiver 810, wireless device beam communication manager 815, and transmitter 820. wireless device 805 may also include a processor. Each of these components may be in communication with one another (e.g., via one or more buses).

Receiver 810 may receive information such as packets, user data, or control information associated with various information channels (e.g., control channels, data channels, and information related to mesh network, etc.). Information may be passed on to other components of the device. The receiver 810 may be an example of aspects of the transceiver 1135 described with reference to FIG. 11. The receiver 810 may utilize a single antenna or a set of antennas.

Receiver 810 may receive data at a first wireless device via a first mmW communication beam of a base station, receive, from the base station, route information indicating a path to a second wireless device associated with the second mmW communication beam, and receive an indication that the second wireless device is associated with the second mmW communication beam.

Wireless device beam communication manager 815 and/or at least some of its various sub-components may be implemented in hardware, software executed by a processor, firmware, or any combination thereof. If implemented in software executed by a processor, the functions of the wireless device beam communication manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The wireless device beam communication manager 815 and/or at least some of its various sub-components may be physically located at various positions, including being distributed such that portions of functions are implemented at different physical locations by one or more physical devices. In some examples, wireless device beam communication manager 815 and/or at least some of its various sub-components may be a separate and distinct component in accordance with various aspects of the present disclosure. In other examples, wireless device beam communication manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Wireless device beam communication manager 815 may identify that a performance level of the first mmW communication beam is below a threshold value based on the data and communicate data to the base station over a transmission route based on a performance level of a second mmW communication beam, where the transmission route includes a first segment that includes a wireless mesh network and a second segment that includes a second mmW communication beam.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
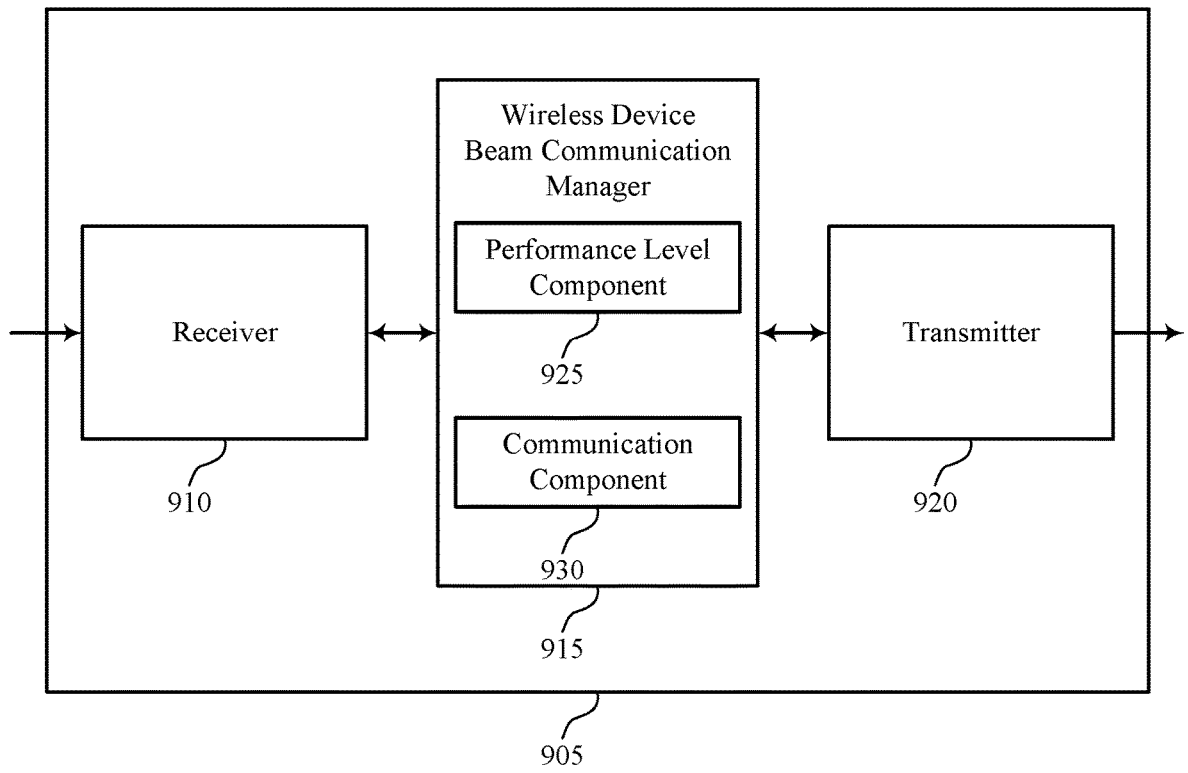

FIG. 9 shows a block diagram 900 of a wireless device 905 that supports load balancing in a MIMO system using a mesh network in accordance with aspects of the present disclosure. Wireless device 905 may be an example of aspects of a wireless device 115 or a wireless device 215 as described with reference to FIGS. 1 and 2. Wireless device 905 may include receiver 910, wireless device beam communication manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to mesh network, etc.). Information may be passed on to other components of the device. The receiver 910 may be an example of aspects of the transceiver 1135 described with reference to FIG. 11. The receiver 910 may utilize a single antenna or a set of antennas.

Wireless device beam communication manager 915 may be an example of aspects of the wireless device beam communication manager 815 described with reference to FIG. 8. Wireless device beam communication manager 915 may also include performance level component 925 and communication component 930. Performance level component 925 may identify that a performance level of the first mmW communication beam is below a threshold value based on data and identify that the performance level of the second mmW communication beam from the base station is above a threshold value based on identifying that the performance level of the first mmW communication beam is below the threshold value. Communication component 930 may communicate data to the base station over a transmission route based on a performance level of a second mmW communication beam, where the transmission route includes a first segment that includes a wireless mesh network and a second segment that includes a second mmW communication beam, where transmitting data to the base station is based on the route information, and where transmitting data to the base station is based on the selecting the route.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
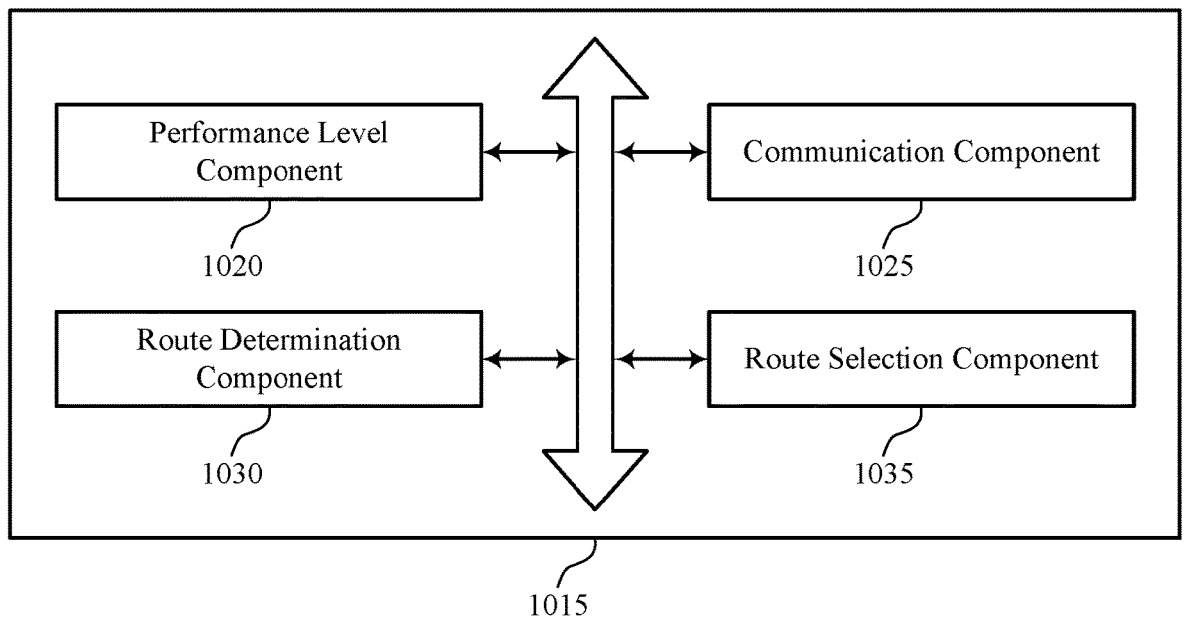

FIG. 10 shows a block diagram 1000 of a wireless device beam communication manager 1015 that supports load balancing in a MIMO system using a mesh network in accordance with aspects of the present disclosure. The wireless device beam communication manager 1015 may be an example of aspects of a wireless device beam communication manager 1015 described with reference to FIGS. 8, 9, and 11. The wireless device beam communication manager 1015 may include performance level component 1020, communication component 1025, route determination component 1030, and route selection component 1035. Each of these modules may communicate, directly or indirectly, with one another (e.g., via one or more buses).

Performance level component 1020 may identify that a performance level of a first mmW communication beam is below a threshold value based on data and identify that the performance level of a second mmW communication beam from a base station is above a threshold value based on identifying that the performance level of the first mmW communication beam is below the threshold value. Communication component 1025 may communicate data to the base station over a transmission route based on a performance level of the second mmW communication beam, where the transmission route includes a first segment that includes a wireless mesh network and a second segment that includes a second mmW communication beam, where transmitting data to the base station is based on the route information, and where transmitting data to the base station is based on the route. Route determination component 1030 may determine a number of hops from a second wireless device to the first wireless device based on a topology of the wireless mesh network. Route selection component 1035 may select a route through the mesh network from the first wireless device to the second wireless device based on determining the number of hops.

Figure 11:
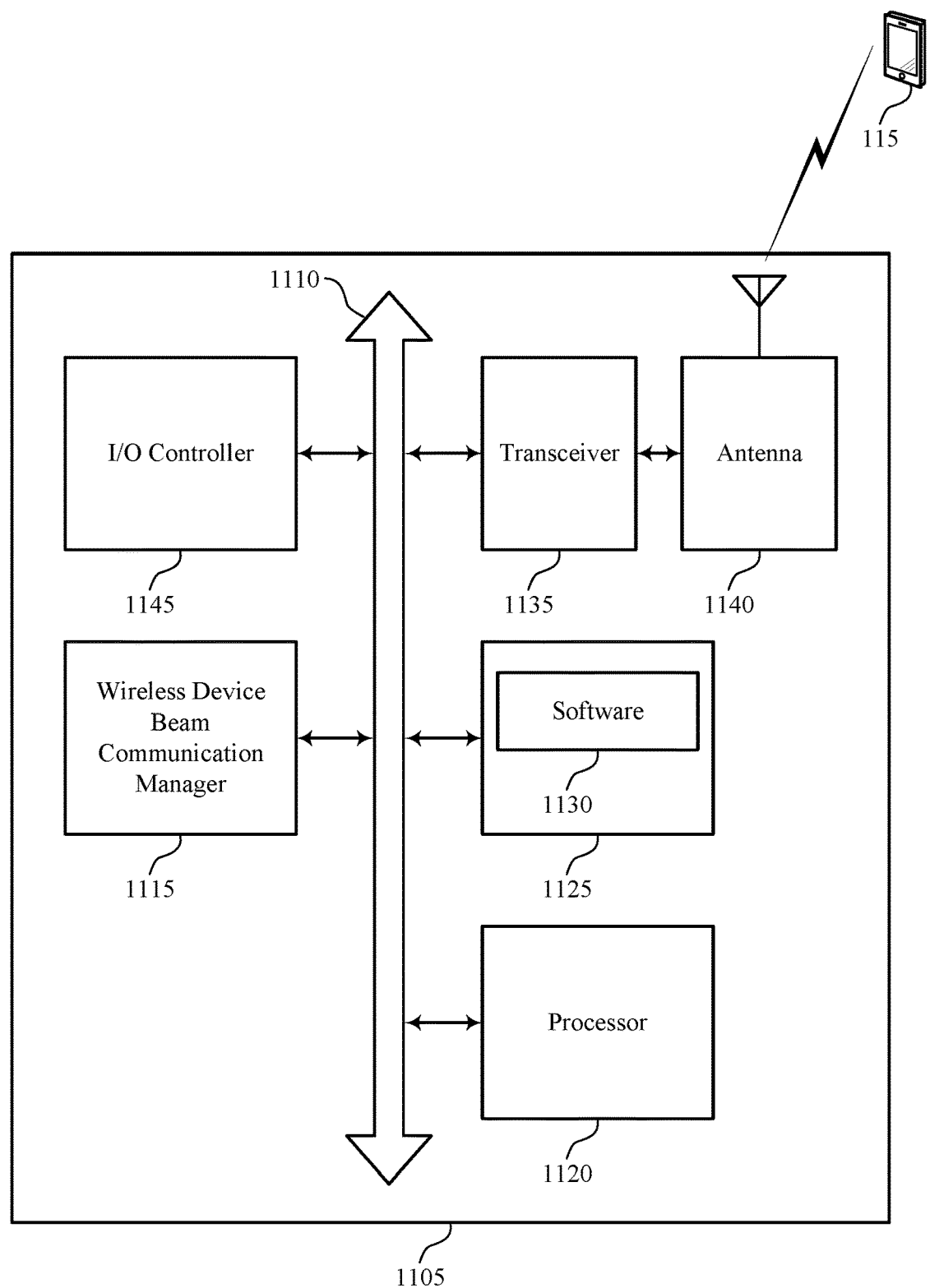
FIG. 11 illustrates a block diagram of a system including a wireless device that supports load balancing in a MIMO system using a mesh network in accordance with aspects of the present disclosure.

FIG. 11 shows a diagram of a system 1100 including a device 1105 that supports load balancing in a MIMO system using a mesh network in accordance with aspects of the present disclosure. Device 1105 may be an example of or include the components of wireless device 115 as described above, e.g., with reference to FIG. 1. Device 1105 may include components for bi-directional voice and data communications including components for transmitting and receiving communications, including wireless device beam communication manager 1115, processor 1120, memory 1125, software 1130, transceiver 1135, antenna 1140, and I/O controller 1145. These components may be in electronic communication via one or more busses (e.g., bus 1110).

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting mesh network).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support mesh network. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
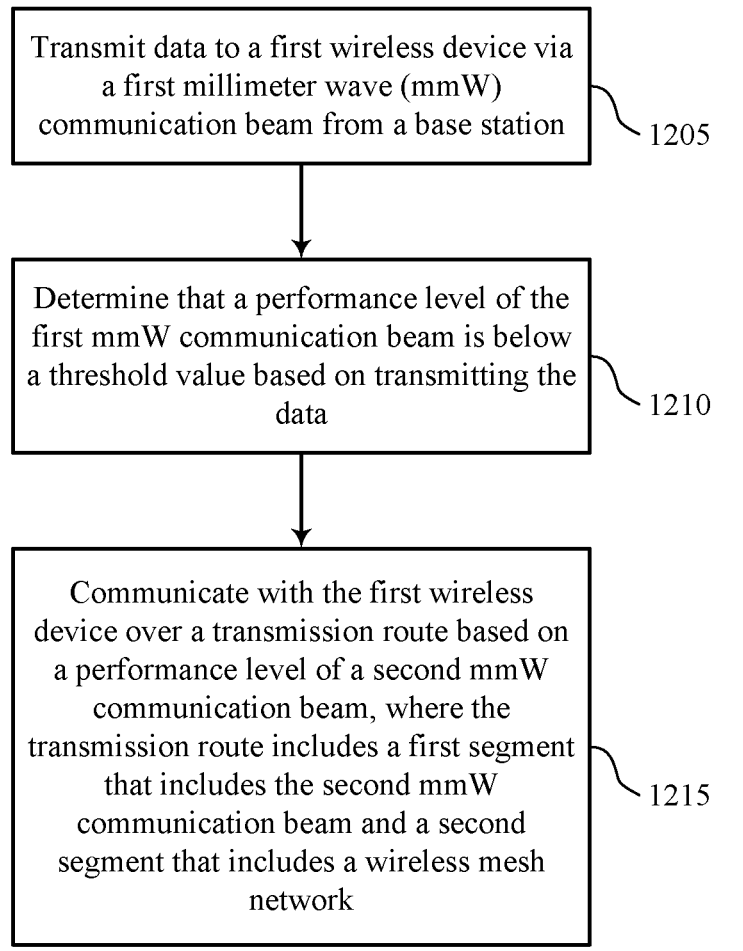
FIGS. 12 through 15 illustrate methods for load balancing in a MIMO system using a mesh network in accordance with aspects of the present disclosure.

FIG. 12 shows a flowchart illustrating a method 1200 for load balancing in a MIMO system using a mesh network in accordance with aspects of the present disclosure. The operations of method 1200 may be implemented by a base station 105 or its components as described herein. For example, the operations of method 1200 may be performed by a base station beam communication manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1205 the base station 105 may transmit data to a first wireless device via a first mmW communication beam. The operations of block 1205 may be performed according to the methods described with reference to FIGS. 4 through 7. In certain examples, aspects of the operations of block 1205 may be performed by a transmitter as described with reference to FIGS. 4 through 7.

At block 1210 the base station 105 may determine that a performance level of the first mmW communication beam is below a threshold value based on transmitting the data. The operations of block 1210 may be performed according to the methods described with reference to FIGS. 4 through 7. In certain examples, aspects of the operations of block 1210 may be performed by a performance level component as described with reference to FIGS. 5 and 6.

At block 1215 the base station 105 may communicate with the first wireless device over a transmission route based on a performance level of a second mmW communication beam, where the transmission route may include a first segment that includes the second mmW communication beam and a second segment that includes a wireless mesh network. The operations of block 1215 may be performed according to the methods described with reference to FIGS. 4 through 7. In certain examples, aspects of the operations of block 1215 may be performed by a communication component as described with reference to FIGS. 5 and 6.

Figure 13:
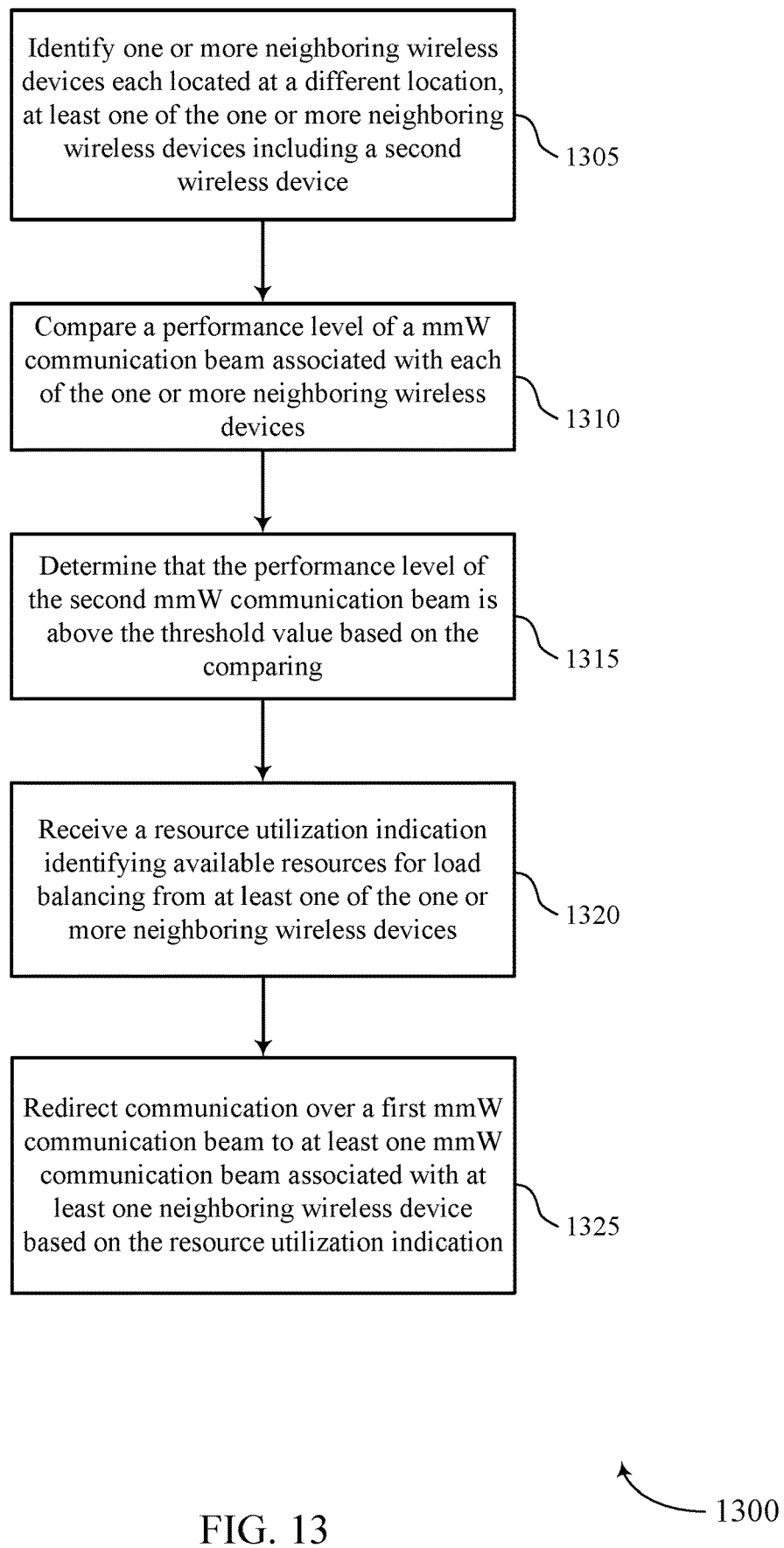

FIG. 13 shows a flowchart illustrating a method 1300 for load balancing in a MIMO system using a mesh network in accordance with aspects of the present disclosure. The operations of method 1300 may be implemented by a base station 105 or its components as described herein. For example, the operations of method 1300 may be performed by a base station beam communication manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify one or more neighboring wireless devices each located at a different location, at least one of the one or more neighboring wireless devices being a second wireless device. The operations of block 1305 may be performed according to the methods described with reference to FIGS. through 7. In certain examples, aspects of the operations of block 1305 may be performed by a device identification component as described with reference to FIGS. 5 and 6.

At block 1310 the base station 105 may compare a performance level of a mmW communication beam associated with each of the one or more neighboring wireless devices. The operations of block 1310 may be performed according to the methods described with reference to FIGS. 4 through 7. In certain examples, aspects of the operations of block 1310 may be performed by a performance comparison component as described with reference to FIGS. 5 and 6.

At block 1315 the base station 105 may determine that the performance level of a second mmW communication beam is above the threshold value based on the comparing. The operations of block 1315 may be performed according to the methods described with reference to FIGS. 4 through 7. In certain examples, aspects of the operations of block 1315 may be performed by a performance comparison component as described with reference to FIGS. 5 and 6.

At block 1320 the base station 105 may receive a resource utilization indication identifying available resources for load balancing from at least one of the one or more neighboring wireless devices. The operations of block 1320 may be performed according to the methods described with reference to FIGS. 4 through 7. In certain examples, aspects of the operations of block 1320 may be performed by a receiver component as described with reference to FIGS. 4 through 7.

At block 1325 the base station 105 may redirect communication over a first mmW communication beam to at least one mmW communication beam associated with at least one neighboring wireless device based on the resource utilization indication. The operations of block 1325 may be performed according to the methods described with reference to FIGS. 4 through 7. In certain examples, aspects of the operations of block 1325 may be performed by a communication component as described with reference to FIGS. 5 and 6.

Figure 14:
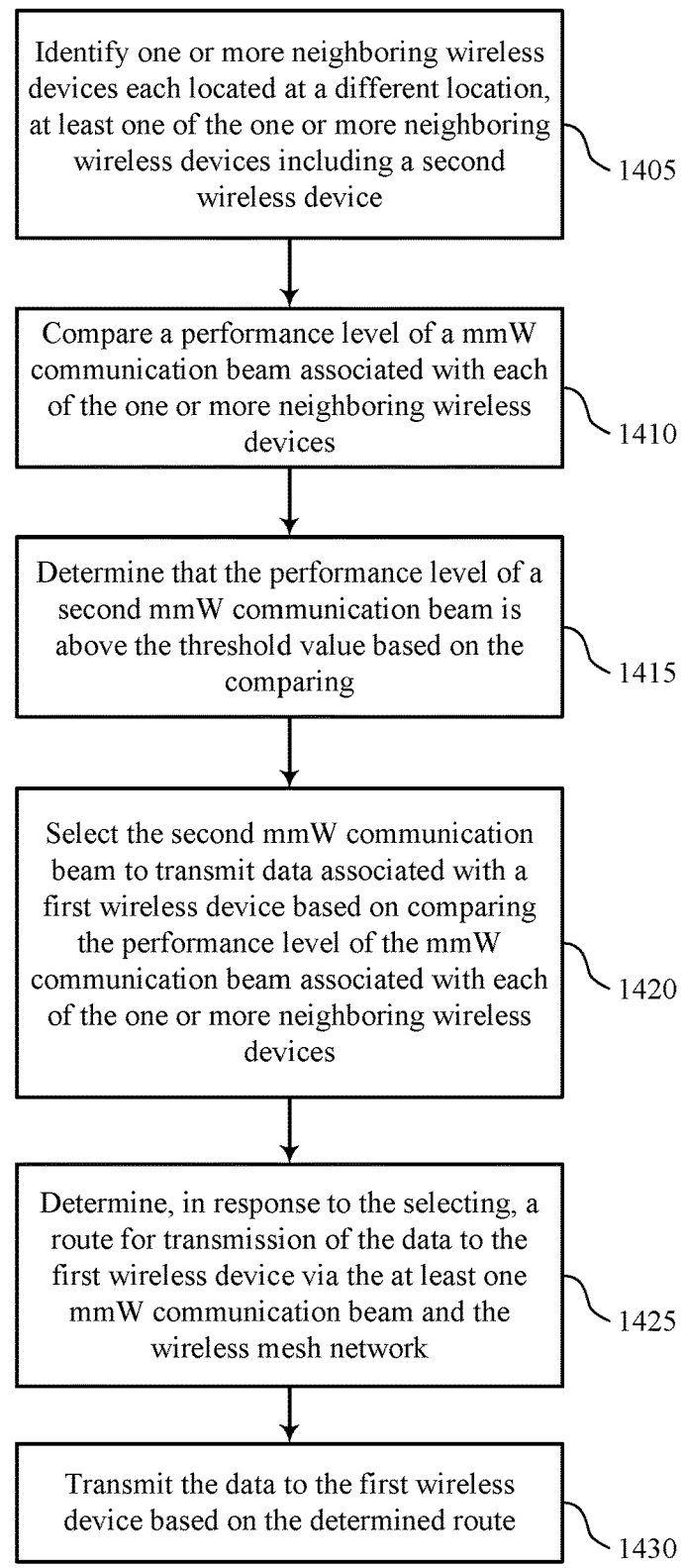

FIG. 14 shows a flowchart illustrating a method 1400 for load balancing in a MIMO system using a mesh network in accordance with aspects of the present disclosure. The operations of method 1400 may be implemented by a base station 105 or its components as described herein. For example, the operations of method 1400 may be performed by a base station beam communication manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify one or more neighboring wireless devices each located at a different location, at least one of the one or more neighboring wireless devices may include a second wireless device. The operations of block 1405 may be performed according to the methods described with reference to FIGS. 4 through 7. In certain examples, aspects of the operations of block 1405 may be performed by a device identification component as described with reference to FIGS. 5 and 6.

At block 1410 the base station 105 may compare a performance level of a mmW communication beam associated with each of the one or more neighboring wireless devices. The operations of block 1410 may be performed according to the methods described with reference to FIGS. 4 through 7. In certain examples, aspects of the operations of block 1410 may be performed by a performance comparison component as described with reference to FIGS. 5 and 6.

At block 1415 the base station 105 may determine that the performance level of a second mmW communication beam is above the threshold value based on the comparing. The operations of block 1415 may be performed according to the methods described with reference to FIGS. 4 through 7. In certain examples, aspects of the operations of block 1415 may be performed by a performance comparison component as described with reference to FIGS. 5 and 6.

At block 1420 the base station 105 may select the second mmW communication beam to transmit data associated with the first wireless device based on comparing the performance level of the mmW communication beam associated with each of the one or more neighboring wireless devices. The operations of block 1420 may be performed according to the methods described with reference to FIGS. 4 through 7. In certain examples, aspects of the operations of block 1420 may be performed by a communication component as described with reference to FIGS. 5 and 6.

At block 1425 the base station 105 may determine, in response to the selecting, a route for transmission of the data to the first wireless device via the at least one mmW communication beam and the wireless mesh network. The operations of block 1425 may be performed according to the methods described with reference to FIGS. 4 through 7. In certain examples, aspects of the operations of block 1425 may be performed by a route determination component as described with reference to FIGS. 5 and 6.

At block 1430 the base station 105 may transmit the data to the first wireless device based on the determined route. The operations of block 1430 may be performed according to the methods described with reference to FIGS. 4 through 7. In certain examples, aspects of the operations of block 1430 may be performed by a communication component as described with reference to FIGS. 5 and 6.

Figure 15:
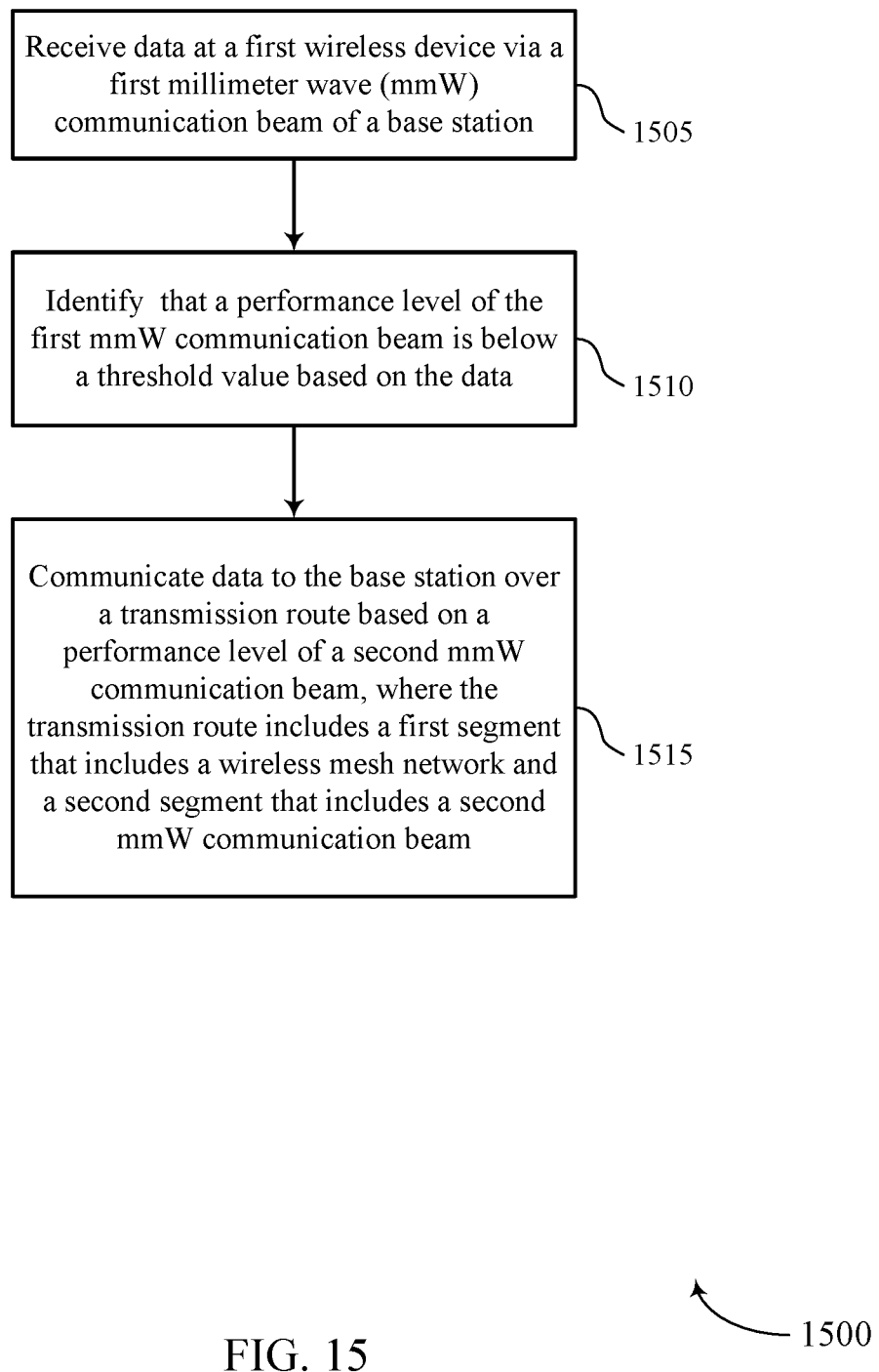

FIG. 15 shows a flowchart illustrating a method 1500 for load balancing in a MIMO system using a mesh network in accordance with aspects of the present disclosure. The operations of method 1500 may be implemented by a wireless device 115 or its components as described herein. For example, the operations of method 1500 may be performed by a wireless device beam communication manager as described with reference to FIGS. 8 through 11. In some examples, a wireless device 115 may execute a set of codes to control the functional elements of the device to perform the functions described below. Additionally or alternatively, the wireless device 115 may perform aspects of the functions described below using special-purpose hardware.

At block 1505 the wireless device 115 may receive data via a first mmW communication beam of a base station. The operations of block 1505 may be performed according to the methods described with reference to FIGS. 8 through 11. In certain examples, aspects of the operations of block 1505 may be performed by a receiver as described with reference to FIGS. 8 through 11.

At block 1510 the wireless device 115 may identify that a performance level of the first mmW communication beam is below a threshold value based on the data. The operations of block 1510 may be performed according to the methods described with reference to FIGS. 8 through 11. In certain examples, aspects of the operations of block 1510 may be performed by a performance level component as described with reference to FIGS. 9 and 10.

At block 1515 the wireless device 115 may communicate data to the base station over a transmission route based on a performance level of a second mmW communication beam. In some cases, the transmission route may include a first segment that includes a wireless mesh network and a second segment that includes a second mmW communication beam. The operations of block 1515 may be performed according to the methods described with reference to FIGS. 8 through 11. In certain examples, aspects of the operations of block 1515 may be performed by a communication component as described with reference to FIGS. 9 and 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. As used in the present disclosure, discussion relating to a gNB may also apply to an eNB and discussion relating to an eNB may also apply to a gNB, unless otherwise indicated. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The wireless devices described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by wireless devices with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by wireless devices with service subscriptions with the network provider. A femto cell may also cover a small geographic area (e.g., a home) and may provide restricted access by wireless devices having an association with the femto cell (e.g., wireless devices in a closed subscriber group (CSG), wireless devices for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:
1. A method for wireless communication, comprising:
   transmitting data to a first wireless device via a first millimeter wave (mmW) communication beam from a base station;

determining that a performance level of the first mmW communication beam is below a threshold value based at least in part on transmitting the data;

comparing a number of hops between at least one neighboring wireless device and the first wireless device;

selecting a transmission path from the at least one neighboring wireless device to the first wireless device based at least in part on the comparing the number of hops, a topology of a wireless mesh network, and a resource utilization of the at least one neighboring wireless device in the wireless mesh network; and communicating with the first wireless device in parallel over the first mmW communication beam and a transmission route between the base station and the first wireless device based at least in part on a performance level of a second mmW communication beam, wherein the transmission route comprises a first segment that includes the second mmW communication beam between the base station the at least one neighboring wireless device and a second segment that includes the selected transmission path from the at least one neighboring wireless device and the first wireless device.

2. The method of claim 1, further comprising:
determining that the performance level of the second mmW communication beam from the base station is above the threshold value based at least in part on determining that the performance level of the first mmW communication beam is below the threshold value.

3. The method of claim 1, wherein the second mmW communication beam from the base station is associated with the at least one neighboring wireless device.

4. The method of claim 3, wherein the wireless mesh network comprises the first wireless device at a first structure and the at least one neighboring wireless device at a second structure that is different from the first structure.

5. The method of claim 3, wherein the base station is a serving base station for the first wireless device and the at least one neighboring wireless device.

6. The method of claim 1, wherein the performance level of the first mmW communication beam is based on data traffic, a quality of service (QoS), a quality of a communication link between the base station and the first wireless device, a received signal strength indicator (RSSI), a signal to noise ratio (SNR), or a combination thereof.

7. The method of claim 1, wherein the performance level of the second mmW communication beam is based on a data traffic, a quality of service (QoS), a quality of a communication link between the base station and the at least one neighboring wireless device, a received signal strength indicator (RSSI), a signal to noise ratio (SNR), or a combination thereof.

8. The method of claim 1, wherein determining that the performance level of the first mmW communication beam is below the threshold value comprises:
identifying one or more neighboring wireless devices each located at a different location, at least one of the one or more neighboring wireless devices comprising the at least one neighboring wireless device;

comparing a performance level of a mmW communication beam associated with each of the one or more neighboring wireless devices; and determining that the performance level of the second mmW communication beam is above the threshold value based at least in part on the comparing.

9. The method of claim 8, wherein comparing the performance level of the mmW communication beam associated with each of the one or more neighboring wireless devices comprises:
comparing a network load capacity of the mmW communication beam associated with each of the one or more neighboring wireless devices based at least in part on network resources of the base station and a resource utilization of at least one service associated with each of the one or more neighboring wireless devices.

10. The method of claim 9, further comprising:
receiving a resource utilization indication identifying available resources for load balancing from at least one of the one or more neighboring wireless devices; and redirecting communication over the first mmW communication beam to at least one mmW communication beam associated with the at least one neighboring wireless device based at least in part on the resource utilization indication.

11. The method of claim 8, further comprising:
selecting the second mmW communication beam to transmit data associated with the first wireless device based at least in part on comparing the performance level of the mmW communication beam associated with each of the one or more neighboring wireless devices;

determining, in response to selecting the second mmW communication beam, a route for transmission of the data to the first wireless device via the second mmW communication beam and the wireless mesh network based at least in part on selecting the transmission path; and transmitting the data to the first wireless device based at least in part on the determined route.

12. The method of claim 1, further comprising:
transmitting a capability indication of the second mmW communication beam to the first wireless device via the selected transmission path.

13. The method of claim 1, further comprising:
transmitting route information to the first wireless device via the selected transmission path, the route information indicating a path through the wireless mesh network to the at least one neighboring wireless device associated with the second mmW communication beam.

14. A method for wireless communication, comprising:
receiving data at a first wireless device via a first millimeter wave (mmW) communication beam of a base station;

identifying that a performance level of the first mmW communication beam is below a threshold value based at least in part on the data;

comparing a number of hops between at least one neighboring wireless device and the first wireless device;

selecting a transmission path from the at least one neighboring wireless device to the first wireless device based at least in part on the comparing the number of hops, a topology of a wireless mesh network, and a resource utilization of the at least one neighboring wireless device in the wireless mesh network; and communicating data with the first wireless device in parallel over the first mmW communication beam and a transmission route between the first wireless device and the base station based at least in part on a performance level of a second mmW communication beam, wherein the transmission route comprises a first segment that includes the first wireless device and the selected transmission path from the at least one neighboring wireless device and a second segment that includes the second mmW communication beam between the at least one neighboring wireless device and the base station.

15. The method of claim 14, further comprising:
identifying that the performance level of the second mmW communication beam from the base station is above the threshold value based at least in part on identifying that the performance level of the first mmW communication beam is below the threshold value.

16. The method of claim 14, further comprising:
receiving, from the base station, route information indicating a path to the at least one neighboring wireless device associated with the second mmW communication beam,
wherein transmitting data to the base station is based at least in part on the route information.

17. The method of claim 16, further comprising:
receiving an indication that the at least one neighboring wireless device is associated with the second mmW communication beam;
determining the number of hops from the at least one neighboring wireless device to the first wireless device based at least in part on the topology of the wireless mesh network; and
selecting a route through the wireless mesh network from the first wireless device to the at least one neighboring wireless device based at least in part on determining the number of hops,
wherein transmitting data to the base station is based at least in part on the selecting the route.

18. An apparatus for wireless communication, comprising:
a processor; and
memory in electronic communication with the processor;
the processor and the memory configured to:
transmit data to a first wireless device via a first millimeter wave (mmW) communication beam from the apparatus;
determine that a performance level of the first mmW communication beam is below a threshold value based at least in part on transmitting the data;
compare a number of hops between at least one neighboring wireless device and the first wireless device;
select a transmission path from the at least one neighboring wireless device to the first wireless device based at least in part on the comparing the number of hops, a topology of a wireless mesh network, and a resource utilization of the at least one neighboring wireless device in the wireless mesh network; and
communicate with the first wireless device in parallel over the first mmW communication beam and a transmission route between the apparatus and the first wireless device based at least in part on a performance level of a second mmW communication beam, wherein the transmission route comprises a first segment that includes the second mmW communication beam between the apparatus the at least one neighboring wireless device and a second segment that includes the selected transmission path from the at least one neighboring wireless device and the first wireless device.

19. The apparatus of claim 18, wherein the instructions, when executed by the processor, are further configured to cause the apparatus to:
determine that the performance level of the second mmW communication beam from the apparatus is above the threshold value based at least in part on determining that the performance level of the first mmW communication beam is below the threshold value.

* * * * *